(12) United States Patent
Raghavan et al.

(10) Patent No.: US 11,956,183 B2
(45) Date of Patent: *Apr. 9, 2024

(54) INDICATION OF ASYMMETRIC DEFAULT OPERATING FREQUENCIES FOR BIDIRECTIONAL COMMUNICATIONS

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,749

(22) Filed: Jan. 24, 2023

(65) Prior Publication Data

US 2023/0163938 A1   May 25, 2023

Related U.S. Application Data

(63) Continuation of application No. 17/104,432, filed on Nov. 25, 2020, now Pat. No. 11,606,184.

(51) Int. Cl.
*H04L 5/14* (2006.01)
*H04W 72/0453* (2023.01)

(52) U.S. Cl.
CPC ........... *H04L 5/14* (2013.01); *H04W 72/0453* (2013.01)

(58) Field of Classification Search
None
See application file for complete search history.

(56) References Cited

U.S. PATENT DOCUMENTS

2011/0069633 A1  3/2011  Schmidt et al.
2014/0248917 A1  9/2014  Scipione et al.
(Continued)

FOREIGN PATENT DOCUMENTS

WO    WO2020022939 A1    1/2020

OTHER PUBLICATIONS

International Search Report and Written Opinion—PCT/US2021/071992—ISA/EPO—dated Feb. 25, 2022.
(Continued)

*Primary Examiner* — Marcus Smith
(74) *Attorney, Agent, or Firm* — Holland & Hart LLP

(57) ABSTRACT

This disclosure provides systems, methods and apparatus, including computer programs encoded on computer storage media, for indication of asymmetric default operating frequencies (DOFs) for bidirectional communications. In one aspect, a first device may report to the second device that the first device is using either a same DOF for communications in different transmission directions or different DOFs for the different transmission directions. Based on the reported DOF(s), the second device may use beam correspondence-based beam relationships on the different transmission directions if the DOFs are the same and resource block allocations for the communications in both transmission directions are closely matched in frequencies. Alternatively, if the DOFs are different for the different transmission directions, the second device may adjust either a codebook parameter or may use an appropriate antenna panel. Additionally, or alternatively, the second device may direct the first device to use respective antenna subarrays with similar DOFs.

27 Claims, 9 Drawing Sheets

(56) References Cited

U.S. PATENT DOCUMENTS

| | | | |
|---|---|---|---|
| 2016/0218438 A1* | 7/2016 | Miraftab | H01Q 9/045 |
| 2017/0126309 A1* | 5/2017 | Rupasinghe | H04B 7/024 |
| 2019/0253925 A1* | 8/2019 | Gholmieh | H04B 1/005 |
| 2020/0305168 A1 | 9/2020 | Liou | |
| 2020/0314837 A1 | 10/2020 | Oh et al. | |
| 2021/0099205 A1* | 4/2021 | Seyed | H04L 5/14 |
| 2021/0266721 A1 | 8/2021 | Tang et al. | |
| 2022/0030570 A1* | 1/2022 | Xu | H04L 5/0051 |
| 2022/0115790 A1* | 4/2022 | Ueda | H01Q 23/00 |
| 2022/0166596 A1 | 5/2022 | Raghavan | |
| 2022/0255610 A1* | 8/2022 | Barabash | H04B 7/0686 |

OTHER PUBLICATIONS

Samsung: "V2X Multi-Carrier Operation: Sidelink UE Information Enhancement", 3GPP Draft, R2-1701356, 3GPP TSG-RAN WG2 #97, INTER-Carrier SL UE Information Enhancement, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13, 2017-Feb. 17, 2017, Feb. 12, 2017 (Feb. 12, 2017), XP051212018, 2 Pages, The Whole Document.

* cited by examiner

INDICATION OF ASYMMETRIC DEFAULT OPERATING FREQUENCIES FOR BIDIRECTIONAL COMMUNICATIONS

CROSS REFERENCES

The present Application for Patent is a Continuation of U.S. Pat. No. 11,606,184 by Raghavan et al., entitled "INDICATION OF ASYMMETRIC DEFAULT OPERATING FREQUENCIES FOR BIDIRECTIONAL COMMUNICATIONS" filed Nov. 25, 2020, assigned to the assignee hereof, and expressly incorporated herein.

TECHNICAL FIELD

This disclosure relates to wireless communications, including indication of asymmetric default operating frequencies (DOFs) for bidirectional communications.

DESCRIPTION OF THE RELATED TECHNOLOGIES

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a device may use a first frequency for a first transmission direction (for example, uplink communications, downlink communications, or sidelink communications), while employing a different frequency for a second transmission direction different than the first transmission direction. For example, the device may use different frequencies to reduce transmission intensity in one of the transmission directions to comply with radiation exposure requirements (for example, maximum permissible exposure (MPE) requirements). Efficient techniques are desired for enabling communications in different transmission directions on different frequencies.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications. The method may include transmitting, by a first wireless device, an indication of a first default operating frequency (DOF) for communications with a second wireless device in a first transmission direction, a second DOF for communications with the second wireless device in a second transmission direction, or both and communicating with the second wireless device in the first transmission direction on the first DOF, the second transmission direction on the second DOF, or both.

Another innovative aspect of the subject matter described in this disclosure can be implemented in an apparatus for wireless communications. The apparatus may include at least a first interface and a second interface. The first interface may be configured to transmit (for example, output), by a first wireless device, an indication of: a first DOF for communications with a second wireless device in a first transmission direction, a second DOF for communications with the second wireless device in a second transmission direction, or both. Additionally, the first interface or the second interface may be configured to communicate with the second wireless device in the first transmission direction on the first DOF, the second transmission direction on the second DOF, or both.

Another innovative aspect of the subject matter described in this disclosure can be implemented in another apparatus for wireless communications. The apparatus may include means for transmitting, by a first wireless device, an indication of: a first DOF for communications with a second wireless device in a first transmission direction, a second DOF for communications with the second wireless device in a second transmission direction, or both and means for communicating with the second wireless device in the first transmission direction on the first DOF, the second transmission direction on the second DOF, or both.

Another innovative aspect of the subject matter described in this disclosure can be implemented in a non-transitory computer-readable medium storing code for wireless communications. The code may include instructions executable by a processor to transmit, by a first wireless device, an indication of: a first DOF for communications with a second wireless device in a first transmission direction, a second DOF for communications with the second wireless device in a second transmission direction, or both and communicate with the second wireless device in the first transmission direction on the first DOF, the second transmission direction on the second DOF, or both.

In some implementations, the method, apparatuses, and non-transitory computer-readable medium described herein may further include operations, features, means, or instructions for receiving, in response to the indication of the first DOF, the second DOF, or both, an indication of a first codebook parameter to use for the communications in the first transmission direction, a second codebook parameter to use for the communications in the second transmission direction, or both, where the communications with the second wireless device may be based on receiving the indication of the first codebook parameter, the second codebook parameter, or both.

In some implementations, the method, apparatuses, and non-transitory computer-readable medium described herein may further include operations, features, means, or instructions for receiving, in response to the indication of the first DOF, the second DOF, or both, an indication of a first antenna subarray to use for the communications in the first transmission direction, a second antenna subarray to use for the communications in the second transmission direction, or both, where the communications with the second wireless device may be based on receiving the indication of the first antenna subarray, the second antenna subarray, or both.

In some implementations, for the method, apparatuses, and non-transitory computer-readable medium described herein, communicating with the second wireless device may include operations, features, means, or instructions for communicating with the second wireless device in the first transmission direction on the first DOF using a first set of antenna elements, in the second transmission direction on the second DOF using a second set of antenna elements, or both, where the indication of the first DOF, the second DOF, or both includes an indication of the first set of antenna elements and the second set of antenna elements.

In some implementations, for the method, apparatuses, and non-transitory computer-readable medium described herein, the first set of antenna elements and the second set of antenna elements may at least partially overlap on a same antenna panel, the first set of antenna elements may be located on a first antenna panel and the second set of antenna elements may be located on a second antenna panel different than the first antenna panel, or a combination thereof.

In some implementations, for the method, apparatuses, and non-transitory computer-readable medium described herein, communicating with the second wireless device may include operations, features, means, or instructions for communicating with the second wireless device in the first transmission direction on the first DOF using a first radio frequency (RF) chain, in the second transmission direction on the second DOF using a second RF chain, or both, where the first RF chain corresponds to the first DOF and the second RF chain may be corresponds to the second DOF.

In some implementations, for the method, apparatuses, and non-transitory computer-readable medium described herein, the first DOF may be different than the second DOF.

In some implementations, for the method, apparatuses, and non-transitory computer-readable medium described herein, the first DOF may be the same as the second DOF.

Another innovative aspect of the subject matter described in this disclosure can be implemented in a method for wireless communications is described. The method may include receiving an indication of a first DOF for communications with a first wireless device in a first transmission direction, a second DOF for communications with the first wireless device in a second transmission direction, or both and communicating with the first wireless device according to one or more transmission parameters corresponding to the first DOF, the second DOF, or both.

Another innovative aspect of the subject matter described in this disclosure can be implemented in an apparatus for wireless communications is described. The apparatus may include at least a first interface and a second interface. The first interface may be configured to receive (for example, obtain) an indication of a: first DOF for communications with a first wireless device in a first transmission direction, a second DOF for communications with the first wireless device in a second transmission direction, or both. Additionally, the first interface or the second interface may be configured to communicate with the first wireless device according to one or more transmission parameters corresponding to the first DOF, the second DOF, or both.

Another innovative aspect of the subject matter described in this disclosure can be implemented in another apparatus for wireless communications is described. The apparatus may include means for receiving an indication of a first DOF for communications with a first wireless device in a first transmission direction, a second DOF for communications with the first wireless device in a second transmission direction, or both and means for communicating with the first wireless device according to one or more transmission parameters corresponding to the first DOF, the second DOF, or both.

Another innovative aspect of the subject matter described in this disclosure can be implemented in a non-transitory computer-readable medium storing code for wireless communications is described. The code may include instructions executable by a processor to receive an indication of a: first DOF for communications with a first wireless device in a first transmission direction, a second DOF for communications with the first wireless device in a second transmission direction, or both and communicate with the first wireless device according to one or more transmission parameters corresponding to the first DOF, the second DOF, or both.

In some implementations, the method, apparatuses, and non-transitory computer-readable medium described herein may further include operations, features, means, or instructions for transmitting, to the first wireless device, an indication of a first codebook parameter for the communications in the first transmission direction, a second codebook parameter for the communications in the second transmission direction, or both, the first codebook parameter corresponding to the first DOF and the second codebook parameter corresponding to the second DOF, where the first codebook parameter and the second codebook parameter may be determined based on a difference between the first DOF and the second DOF satisfying a threshold.

In some implementations, the method, apparatuses, and non-transitory computer-readable medium described herein may further include operations, features, means, or instructions for transmitting, to the first wireless device, an indication of a first antenna subarray for the first wireless device to use for the communications in the first transmission direction, a second antenna subarray for the first wireless device to use for the communications in the second transmission direction, or both, the first antenna subarray corresponding to the first DOF and the second antenna subarray corresponding to the second DOF, where the first antenna subarray and the second antenna subarray may be determined based on a difference between the first DOF and the second DOF satisfying a threshold.

In some implementations, for the method, apparatuses, and non-transitory computer-readable medium described herein, communicating with the first wireless device may include operations, features, means, or instructions for communicating with the first wireless device according to a beam correspondence-based relationship between the communications in the first transmission direction and the communications in the second transmission direction, where the beam correspondence-based relationship may be determined based on one or more of the first DOF being the same as the second DOF, a first resource allocation for the communications in the first transmission direction, or a second resource allocation for the communications in the second transmission direction.

In some implementations, for the method, apparatuses, and non-transitory computer-readable medium described herein, communicating with the first wireless device may include operations, features, means, or instructions for communicating with the first wireless device in the first transmission direction on the first DOF using a first antenna panel, in the second transmission direction on the second DOF using a second antenna panel, or both, the first antenna panel corresponding to the first DOF and the second antenna panel corresponding to the second DOF.

In some implementations, for the method, apparatuses, and non-transitory computer-readable medium described herein, the first DOF may be different than the second DOF.

In some implementations, for the method, apparatuses, and non-transitory computer-readable medium described herein, the first DOF may be the same as the second DOF.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
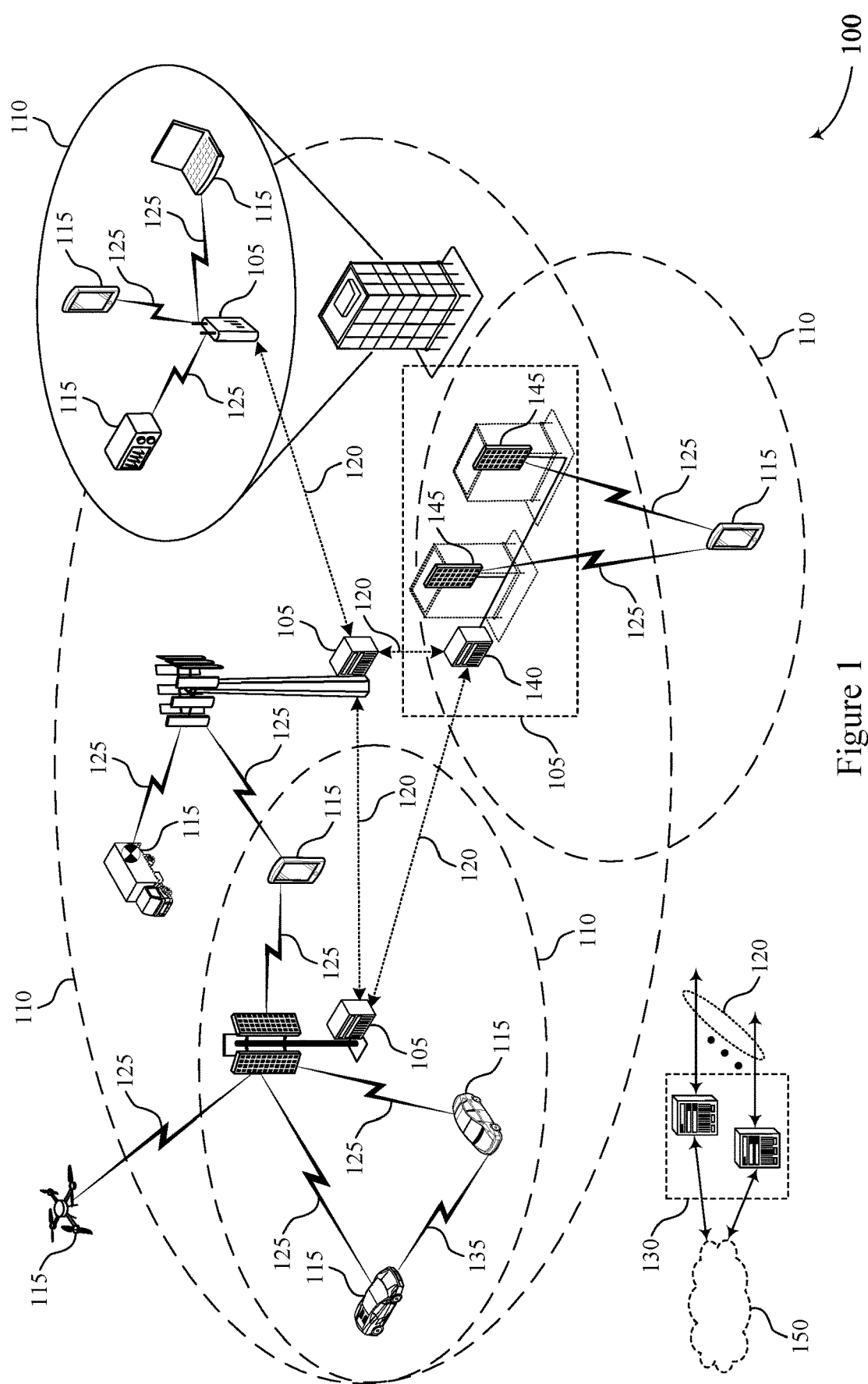
FIG. 1 illustrates an example of a wireless communications system that supports indication of asymmetric default operating frequencies (DOFs) for bidirectional communications.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a user equipment (UE) may operate in the ultra-wide bandwidth range (for example, over frequency bands covering 26 GHz, 52.6 GHz, 71 GHz, etc.). Because the wavelength in the upper-band frequencies of this range is smaller than the wavelength in lower frequencies (such as 6 GHz or below), more antenna elements can be packed in the same physical aperture in the upper-band frequencies than in the lower frequencies. Thus, a UE may include more antenna elements for communication over the upper-band frequencies than for the lower-band frequencies. In such a regime, a UE may use a single radio frequency (RF) chain (for example, a set of components used to transmit or receive signals, such as amplifiers, filters, mixers, analog-to-digital and digital-to-analog converters, attenuators, detectors, or combination thereof, etc.). However, using a single RF chain may lead to poor performance at certain frequencies (for example, at lower frequencies, such as 6 GHz and below, due to beam squinting). Accordingly, the UE may operate according to a first default operating frequency (DOF) when performing communications in a first transmission direction with an additional device, and the UE may operate according to a second DOF when performing communications in a second transmission direction with the additional device. In a non-limiting example, a DOF for the first transmission direction may be chosen to handle maximum permissible exposure (MPE) constraints, while a separate DOF for the second transmission direction may provide better communications performance (for example, higher signal strength). If the second device is unaware of the DOF used by a UE for communications in the corresponding transmission directions, latency and unreliability may be introduced into the wireless communications system.

A first and second device may support methods for indication of asymmetric DOFs for communications in different transmission directions for ultra-wide bandwidth beamforming systems. For example, the first device may report to the second device that the first device is using either a same DOF for communications in the different transmission directions or different DOFs for communications in the different transmission directions separately. Based on the reported DOF(s), the second device may use beam correspondence-based beam relationships on the different transmission directions if the DOFs are the same and resource block/reference signal allocations for the communications in both transmission directions that are closely matched in frequencies. In situations where the DOFs are different for the communications in the different transmission directions, the second device may adjust either a codebook parameter (for example, designed for an appropriate frequency of interest on either or both transmission directions) or may use an appropriate antenna panel (for example, corresponding to the desired choice of the DOF(s) for the different transmission directions for the first device). Additionally, or alternatively, the second device may direct the first device to use respective antenna subarrays with similar DOFs, otherwise the first device may incur a performance penalty.

Particular implementations of the subject matter described in this disclosure can be implemented to realize one or more of the following potential advantages. By indicating the DOFs used for respective transmission directions, a device receiving the indication (for example, a second device) may know which DOFs the device transmitting the indication is using for the respective transmission directions. As such, the device receiving the indication may schedule communications or adjust transmission parameters according to the DOF(s). Additionally, the indication of the DOFs may reduce latency and improve reliability of communications between the two devices (for example, by using the adjusted transmission parameters or scheduled communications that are based on the DOFs). For example, rather than using a trial and error procedure to determine what transmission parameters to use, where the trial and error procedure may include retransmissions or failed transmissions, the device receiving the indication may proactively determine the transmission parameters based on the DOFs and may preempt one or more retransmissions or failed transmissions, thereby reducing latency, power consumption, and thermal profiles.

FIG. 1 illustrates an example of a wireless communications system 100 that supports indication of asymmetric DOFs for bidirectional communications. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or another interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RB s)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may operate in upper-band frequencies (for example, FR4 with frequencies in the 52.6 GHz-114.25 GHz frequency band). Because the wavelength in the upper-band frequencies (for example, FR4) is smaller than the wavelength in lower frequencies, more antenna elements can be packed in the same physical aperture in the upper-band frequencies than in the lower-band frequencies. For example, antennas or antenna elements for upper-band frequencies are spaced at shorter (or smaller) distances to match the shorter wavelengths, resulting in a larger number of antenna elements being able to be placed in an antenna module or a given physical aperture. In some examples, a UE may operate in the ultra-wide band (for example, the 57 GHz-71 GHz frequency band). Operating in such a band may allow significant performance and beamforming gains. However, in many devices, a single RF chain may be used over the ultra-wide band, as, for example the cost of adjusting beam weights may be too high, latency associated with shifting beam weights may dominate, etc.

Since a single radio frequency (RF) chain may use a single set of phase shifters, analog beamforming may be constrained, and may lead to poor performance at certain frequencies (for example, at lower frequencies, such as 6 GHz and below, due to beam squinting). In some examples, analog beamforming with a limited number of RF chains may be performed over an antenna array in FR4. In such examples, an analog beamforming codebook may be optimized for some carrier frequencies (for example, the DOF) over the ultra-wide band. The DOF may be specific to the UE (for example, the DOF may depend on the structure of the UE's antenna array), and therefore may not be known to the base station.

The wireless communications system 100 may support efficient techniques for a UE 115 to send an indication to a base station 105 of the DOF selection of a UE. For example, a UE may indicate that either the same DOF is used for uplink and downlink communications, or a different DOF is used for uplink and downlink communications. Based on the DOF indication, a base station may adjust transmission parameters. For example, if the DOFs used for uplink and downlink transmissions are different, the base station may use beam correspondence-based beam relationships for communication. Alternatively, if the UE indicated that the DOFs for uplink and downlink transmissions are the same, a base station may adjust either a codebook parameter (designed for an appropriate frequency of interest on uplink or downlink or both) or use an appropriate panel (corresponding to the desired choice of UE's DOF as in uplink/downlink).

Figure 2:
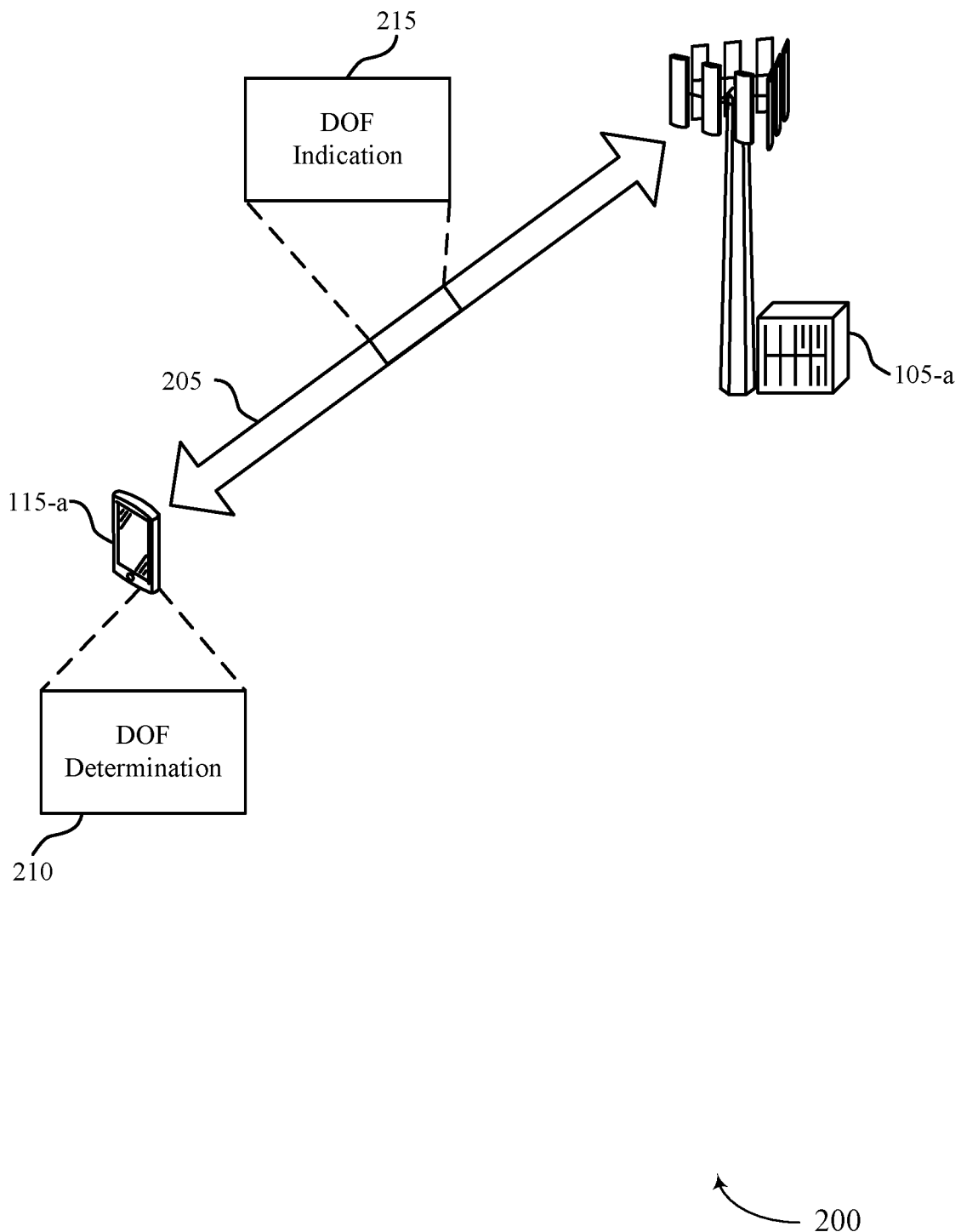
FIG. 2 illustrates a DOF signaling operation example that supports indication of asymmetric DOFs for bidirectional communications.

FIG. 2 illustrates an example of a DOF signaling operation example 200 that supports indication of asymmetric DOFs for bidirectional communications. The DOF signaling operation example 200 may implement aspects of wireless communications system 100. For example, the DOF signaling operation example 200 may include wireless communications between a base station 105-a and UE 115-a, which may represent corresponding base stations 105 and UEs 115, respectively, as described with reference to FIG. 1. Additionally, the base station 105-a and the UE 115-a may support beamformed communications as described with reference to FIG. 1 to transmit and receive messages to and from each other. In some examples, the UE 115-a and the base station 105-a may communicate on resources of a carrier 205.

The UE 115-a and the base station 105-a may communicate over one or more RF spectrum bands, such as the FR2 or the FR4 RF spectrum bands. FR4 bands, which may be referred to as "upper mmW bands" or as radio frequencies in the "sub-THz regime," may have shorter wavelengths (λ) than FR2 bands. For example, FR2 bands may include RF spectrum bands between 24.25 and 52.6 GHz, and FR4 bands may include RF spectrum bands between 52.6 GHz and 114.25 GHz. In some examples, because FR4 bands have shorter wavelengths than FR2 bands, more antenna elements may be packed into a same physical aperture in FR4 than in FR2. This difference in wavelengths may result in antenna arrays having a greater number of antenna elements. That is, antennas or antenna elements for higher frequencies are shorter (or smaller) to match the shorter wavelengths, resulting in a higher number of smaller antenna elements being able to be placed in an antenna module or physical aperture. As demand for greater throughput and capacity continue, extensions to higher RF spectrum bands, such as a frequency range 5 (FR5), may be possible, which may result in more densely packed antenna arrays.

In some implementations, sets of antenna elements that make uplink and downlink subarrays (for example, different transmission directions) of antenna modules for the beamformed communications (for example, described in greater detail with reference to FIG. 3) of the UE 115-a may partially overlap within a same antenna module or may be located in entirely different antenna modules. For example, the UE 115-a may use a subarray for downlink transmissions but may determine that a portion of the subarray can be used for uplink transmissions. Because uplink transmissions are more subject to regulatory constraints, a UE which uses the same subarray for uplink and downlink transmissions may exceed MPE requirements on the uplink. Therefore, a UE may determine to use a portion of a subarray for uplink transmissions, so that MPE requirements are satisfied. Additionally, the inter-element spacing for the subarrays used for the uplink and the downlink transmissions may be different. For example, a first subarray used for uplink transmissions may be in a separate module from a second subarray used for downlink transmission, and the inter-element spacing may be different for each module, resulting in different inter-element spacings for different transmission directions.

In some examples, analog beamforming with a limited number of RF chains may be performed over an antenna array in FR4. In such examples, an analog beamforming codebook may be optimized for some carrier frequencies (for example, a DOF) over the ultra-wide band. Additionally, devices operating in the FR2 or FR4 radio frequency spectrum bands may use a portion or a subset of the full radio frequency spectrum band. For example, a device operating over the FR4 radio frequency spectrum band may receive an allocation of a subset frequency range within the 52.6 to 114.25 GHz frequency range (the FR4 radio frequency spectrum band). In some implementations, such a subset frequency range in the FR4 radio frequency spectrum band may be relatively wider as compared to frequency allocations in other radio frequency spectrum bands and, as such, may be referred to herein as an ultra-wide bandwidth. For instance, an approximately 14 GHz wide bandwidth (a 14 GHz subset of the FR4 radio frequency spectrum band) may be available to devices across multiple geographies and, in some cases, a device communicating over such an ultra-wide bandwidth may experience performance and beamforming gains (such as greater throughput). In some aspects, a device may receive an allocation of such a 14 GHz wide bandwidth from 57-71 GHz.

Some devices may use a single RF chain to communicate over the ultra-wide bandwidth (such as an approximately 14 GHz bandwidth range) and, because such devices may use a single set of phase shifters for a single RF chain, analog or RF beamforming may be constrained (or limited to some carrier frequencies) based on the use of a single RF chain, which may result in poor performance at some frequencies. In some implementations, such poor performance at some frequencies as a result of limited analog or radio frequency beamforming may be referred to as "beam squinting." Further, some devices may tune or optimize their radio frequency chain (for example, an analog or radio frequency beamforming codebook) for some carrier frequency, which may be referred to herein as a DOF, over the ultra-wide bandwidth of interest (such as the 14 GHz wide bandwidth from 57-71 GHz).

As such, the devices may experience a greater likelihood for successful communications with another device that is also using a same or similar DOF. In other words, a DOF may correspond to a frequency for which a RF chain is tailored in terms of peak (or increased) beamforming array gain relative to other frequencies within an ultra-wide bandwidth frequency allocation. Additionally, the DOF of a node or device also may be referred to as a metric that captures the frequency whose half wavelength is equal to the inter-element spacing on an antenna array or panel in operation. For example, for some wavelength $\lambda$, an inter-element spacing may be $d=\lambda/2$ and the corresponding DOF may be equal to $c/2=c/2d$, in which c refers to the speed of light. As such, an antenna panel of a device may have a DOF based on the designed or configured inter-element spacing of the antenna panel, and the device may adjust or tailor the DOF of the antenna panel based on configuring or tuning a radio frequency chain of the (coupled to) antenna array or panel.

A DOF may be device- and RF chain-specific and, in some examples, may be unknown at a device at the other end of a link. For example, the UE 115-a may tune or optimize an analog or RF codebook of the UE 115-a for a first DOF and the base station 105-a may be unaware of the first DOF used by the UE 115-a. Accordingly, in some examples, communicating devices may signal (for example, broadcast) or otherwise share information relating to configured DOFs. In some aspects, the signaling may be from a TRP or base station to a UE 115. In some other aspects, the signaling may be from the UE 115 to the TRP or base station.

Based on the differing antenna modules used for the uplink transmissions and for the downlink transmissions (for example, with different numbers of antenna elements, different inter-element spacings, using antenna patches or dipole antennas, different bandwidths for the differing antenna modules, or additional different characteristics, etc., between the differing transmission directions), a first DOF used for uplink transmissions may be different from a second DOF used for downlink transmissions. In a DOF determination 210, the UE 115-a may determine (for example, select) the first DOF to use for uplink transmissions and the second DOF (for example, a different DOF) to use for downlink transmissions. In some implementations, the UE 115-a may make this determination based on which antenna modules are used for uplink and downlink transmissions, the inter-element spacing of the subarrays, as well as dynamic factors such as obstructions between the UE and the base station. Subsequently, the UE 115-a may transmit a DOF indication 215 to indicate the DOFs used for uplink and downlink transmissions to the base station 105-a over the carrier 205.

In some examples, using the DOF indication 215, the UE 115-a may report the same DOF for uplink and downlink transmission (for example, the UE 115-a may determine that the using the same array for uplink and downlink transmissions optimizes wireless communications). In such examples, the base station 105-a may use beam correspondence-based beam relationships on the uplink and on the downlink if the DOFs are the same for uplink and downlink and if RB allocations for the uplink and the downlink are in closely matched frequencies.

In some other examples, using the DOF indication 215, the UE 115-a may report a different DOF for the uplink and downlink transmissions (for example, the UE 115-a may determine that a portion of a subarray used for downlink transmissions is to be used for uplink transmissions based on MPE requirements, subarrays for the uplink and the downlink transmissions are in different antenna modules, different inter-element spacings are used for the uplink and the downlink, or a combination thereof). In such cases, the base station 105-a may adjust either a codebook parameter (designed for an appropriate frequency of interest on uplink or downlink or both) or use an appropriate antenna panel (corresponding to the desired choice of the DOFs for uplink/downlink). Subsequently, the base station 105-a may transmit an indication of the adjusted codebook parameter to the UE 115-a. Additionally, or alternatively, the base station 105-a may direct the UE 115-a to use uplink and downlink subarrays with similar DOF or incur a performance penalty. For example, the base station 105-a may transmit an indication to UE 115-a of an uplink and downlink subarray to use which operate according to a similar DOF.

Although the UE 115-a (for example, a first device or a first wireless device) and the base station 105-a (for example, a second device or a second wireless device) are used to illustrate the communication of the indication of asymmetric DOFs for bidirectional communications in FIG. 2, the described methods may be used for communication between different types of devices. For example, the indication of the asymmetric DOFs may be communicated between any first device and any second device to support the bidirectional communications between the first device and the second device. In some implementations, the first device and the second device may include base stations 105 (for example, gNBs), UEs 115, customer-premises equipment (CPE), TRPs, relay nodes, side link nodes, repeater IAB nodes, or a combination thereof.

Figure 3:
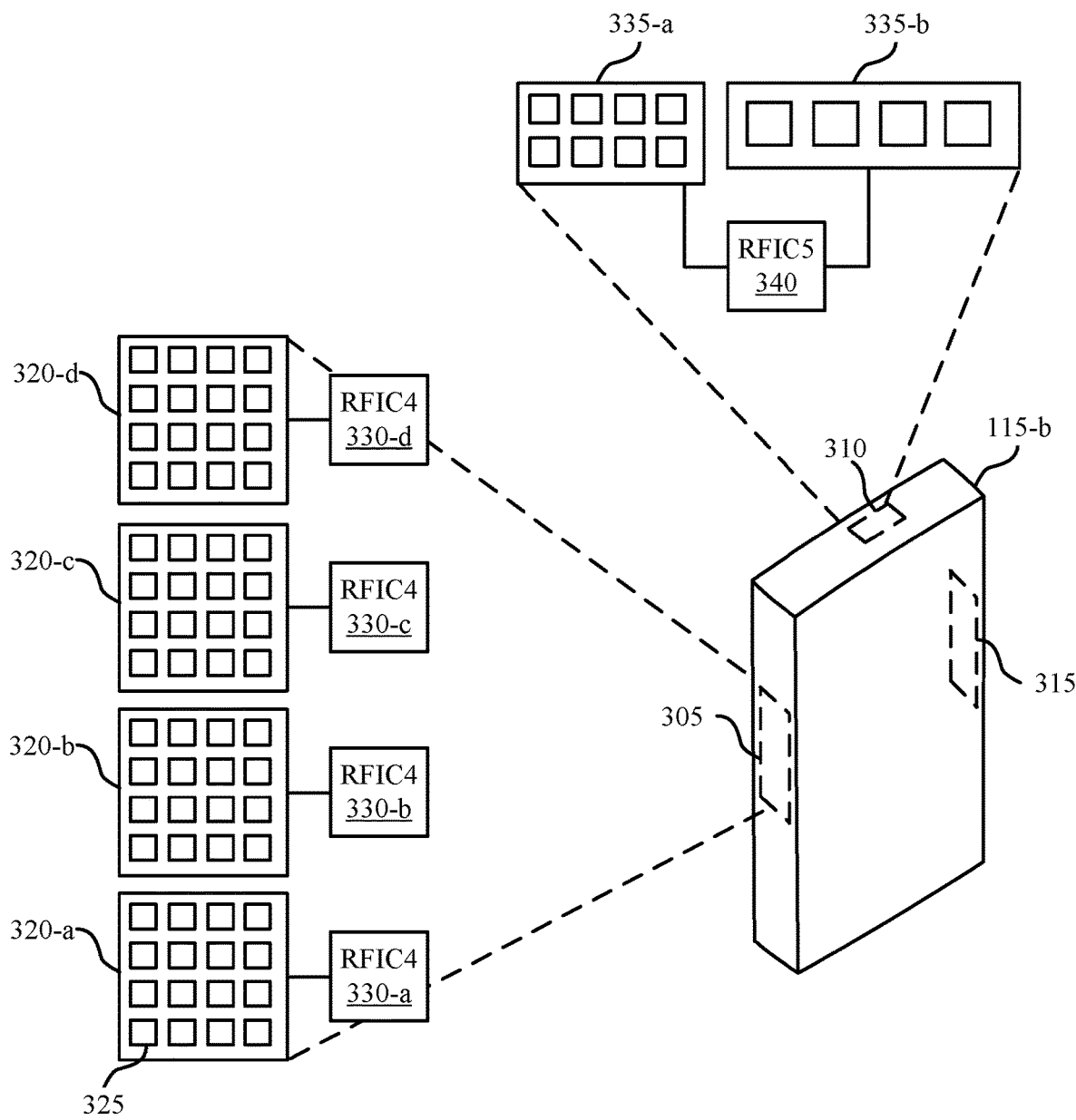
FIG. 3 illustrates a schematic diagram of an example device that supports indication of asymmetric DOFs for bidirectional communications.

FIG. 3 illustrates an example of a wireless communication device with multiple antenna arrays 300 that supports indication of asymmetric DOFs for bidirectional communications. In some examples, wireless communication device with multiple antenna arrays 300 may implement aspects of wireless communications systems 100 and 200. In this example, the wireless communication device may be a UE 115-b, although in other cases the wireless communication device may be a different device, such as a base station 105, a CPE, a TRP, a relay device, a sidelink node, a router, a repeater (for example, a smart repeater or a dumb repeater), or an IAB node.

In this example, the UE 115-b includes a number of different antenna modules, including a first antenna module 305, a second antenna module 310, and a third antenna module 315. Each of the antenna modules 305, 310, and 315 may include a number of subarrays 320 of antenna elements. As one example depicted in FIG. 3, in FR2 (for example, 24.25 to 52.6 GHz), an antenna module of the UE 115-b may include a 4×1 antenna patch subarray (for example, four (4) antenna elements 325 in a single row). Additionally, or alternatively, while not an example depicted in FIG. 3, in FR4 (for example, above 52.6 GHz), an antenna module may include an 8×2 antenna patch subarray for operations at 60 GHz (for example, eight (8) antenna elements 325 in two (2) rows for 16 total antenna elements), a 16×4 antenna patch subarray for operations at 110 GHz (for example, 16 antenna elements 325 in four (4) rows for 64 total antenna elements), or a different configuration with a higher number of antenna elements 325 than is found for FR2.

As shown in this example, the first antenna module 305 may include four subarrays 320, including a first subarray 320-a, a second subarray 320-b, a third subarray 320-c, and a fourth subarray 320-d (for example, the four subarrays 320 may be considered an aggregate antenna panel or an aggregate patch subarray). Each subarray 320 in this example may include 16 individual antenna elements 325 arranged in an array configuration using a 4×4 antenna patch subarray (for example, such that the aggregate antenna panel or the aggregate patch subarray includes 16×4 antenna elements 325 in a 16×4 antenna patch subarray). Each antenna element 325, in some cases, may be a patch antenna element configured to communicate in a high-band mmW deployment. In some examples, the spacing of antenna elements 325 within each subarray 320 may be configured to provide for efficient analog beamforming at wavelengths associated with high-band mmW communications (for example, in FR4). Further, in this example, each subarray 320 may include an associated radio frequency integrated circuit (RFIC) 330.

In the example of FIG. 3, the second antenna module 310 also may include multiple subarrays 335, including a first subarray 335-*a* and a second subarray 335-*b*. In this example, the first subarray 335-*a* includes eight antenna elements arranged in an antenna configuration using a 4×2 antenna patch subarray, and the second subarray 335-*b* includes four antenna elements arranged in an antenna configuration using a 4×1 antenna patch subarray. In this case, a single RFIC (RFICS) 340 may be coupled with the subarrays 335, although multiple RFICs may be used or an RFIC may be shared with one or more other of the antenna modules 305, 310, or 315. While the antenna module 310 is illustrated as having multiple subarrays 335 that are of different sizes, other examples may have a same number of subarrays 335 with each subarray having a same size (for example, four 4×4 antenna patch subarrays similarly as illustrated in the first antenna module 305). Techniques as discussed herein may be applied to any number of antenna modules 305, 310, or 315, any number of subarrays included in each antenna module, any number of antennas per subarray, or any combinations thereof.

As discussed herein, multiple RFICs 330 and associated antenna subarrays 320 may be used at different times by the wireless device. For example, in the case of FIG. 3 where the wireless device is UE 115-*b*, it may be desirable to operate using a subset of the antenna modules 305, 310, or 315, using a subset of antenna subarrays 320 and associated RFICs 330, using a subset of antenna elements 325 within one or more subarrays 320, or any combinations thereof. Such operations may allow the UE 115-*b* to manage power consumption in order to reduce power used by RF components, for example. In other cases, the UE 115-*b* may determine, in addition or alternatively to power consumption considerations, that one or more MPE limitations, one or more thermal limitations, or combinations thereof, make it desirable to use certain groups of antenna elements 325 of one or more subarrays 320. Thus, even though a relatively large number of antenna elements 325 are available at the UE 115-*b*, not all elements may be used at any particular instant in time.

For example, the UE 115-*b* may have a total of N antenna elements 325 across each of the different antenna modules 305, 310, or 315, and may choose K antenna elements 325 for communications, which results in $^{N}C_{K}$ possibilities, which can result in a relatively large number of combinations of different antenna elements 325. Thus, in some cases, the UE 115-*b* may select a relatively small list of antenna groups that are useful at a given time (for example, based on power consumption, MPE consideration, or thermal considerations). The UE 115-*b* may provide an indication of the selected antenna groups to a second device (for example, a base station), and communications using one of the indicated antenna groups may be established.

Additionally, for certain lower frequency ranges (for example, FR2, such as 24.25 to 52.6 GHz, or lower frequency ranges), it is assumed that there is an uplink-downlink beam correspondence. That is, a beam used for downlink communications (modulo some calibration changes that are the same for uplink and downlink) may be reused for uplink communications, so the same or similar beam weights may be used at the different antenna elements 325 of the UE 115-*b* for both the downlink and for the uplink communications. Additionally, the beam correspondence also may assume some tolerance for beam peak difference in uplink and downlink.

For FR4 (for example, upper mmW bands or systems beyond 52.6 GHz), the sets of antennas (for example, the antenna elements 325 or subarrays 320) for the downlink communications and for the uplink communications may be different (for example, dramatically different such that the antenna elements are on different antenna modules, RFICs 330, etc.). For example, arrays, subarrays 320, or antenna elements 325 used for the uplink communications may be same or different as arrays, subarrays 320, or antenna elements 325 used for the downlink communications on same or different panels or modules.

That is, some subarrays 320 used for the uplink communications (for example, uplink subarrays) may be on a same module/panel (for example, pointing in a same direction) as subarrays 320 used for the downlink communications (for example, downlink subarrays), or some of the subarrays 320 used for the uplink communications may be on different modules/panels or may be on the same module/panel as the subarrays 320 used for the downlink communications but pointing in different directions (for example, relative to subarrays 320 used for the downlink communications). Thus, a beam learned for the arrays, subarrays 320, or antenna elements 325 used for the downlink communications with beam training (for example, P-1-2-3 beam training) may not be useful for uplink transmissions (for example, for identifying or refining a beam for the arrays, subarrays 320, or antenna elements 325 used for the uplink communications) in these scenarios.

In some examples, the different sets of antennas may be used for power reasons, performance reasons, RF/architecture reasons, or a combination thereof. For example, a higher number of antenna elements 325 may be used for the downlink communications than for the uplink communications (for example, eight (8) antenna elements 325 used for the downlink communications as opposed to two (2) to four (4) antenna elements 325 used for the uplink communications) based on the downlink communications being less power intensive than the uplink communications. As such, a lesser number of antenna elements 325 may be used for the uplink communications to use less overall power since the uplink communications may expend more power (for example, based on transmitting the communications out requiring more power than merely receiving communications on the higher number of antenna elements 325 for the downlink communications). Additionally, the antenna elements 325 used for the downlink communications may be considered to use less power (for example, less power hungry) while the antenna elements 325 used for the uplink communications may use more power (for example, transmitting on the uplink generally utilizes a higher power consuming power amplifier unlike receiving on the downlink which generally utilizes a lower power consuming low noise amplifier, thereby increasing power consumption of the UE 115-b for the uplink communications).

Accordingly, this asymmetry (for example, the use of different antenna elements 325 for uplink and for downlink communications) may potentially break the uplink-downlink beam correspondence at the UE 115-b (for example, if same antenna elements 325 are used for the uplink and downlink communications, beam correspondence may be supported). For example, any changes or beam weights applied to the sets of antennas for the downlink communications may not be applied to the sets of antennas for the uplink communications. Additionally, or alternatively, the asymmetry of different antenna elements 325 used for uplink and for downlink communications may result in different DOFs for the corresponding transmission directions (for example, a first DOF for uplink communications and a second DOF for downlink communications).

As described herein, the UE 115-b may transmit an indication of a first DOF for a first transmission direction (for example, for uplink communications), a second DOF for a second transmission direction (for example, for downlink communications), or both. The UE 115-b may communicate with a second device (for example, a base station 105, a second UE 115, a CPE, a TRP, a relay node, a sidelink node, a repeater, an IAB node) in the first transmission direction on the first DOF, in the second transmission direction on the second DOF, or both. For example, the UE 115-b may use a first set of antenna elements 325 or a first RF chain to communicate with the second device in the first transmission direction on the first DOF, or may use a second set of antenna elements 325 or a second RF chain to communicate with the second device in the second transmission direction on the second DOF, or both. In some implementations, after transmitting the indication of the first DOF, the second DOF, or both, the second device may adjust one or more transmission parameters (for example, codebook parameters, antenna subarrays for the UE 115-b to use, or a different parameter) for the UE 115-b to use for one or both of the transmission directions based on the first DOF, the second DOF, or both, and the second device may indicate these transmission parameters to the UE 115-b for the UE 115-b to use for subsequent communications.

Figure 4:
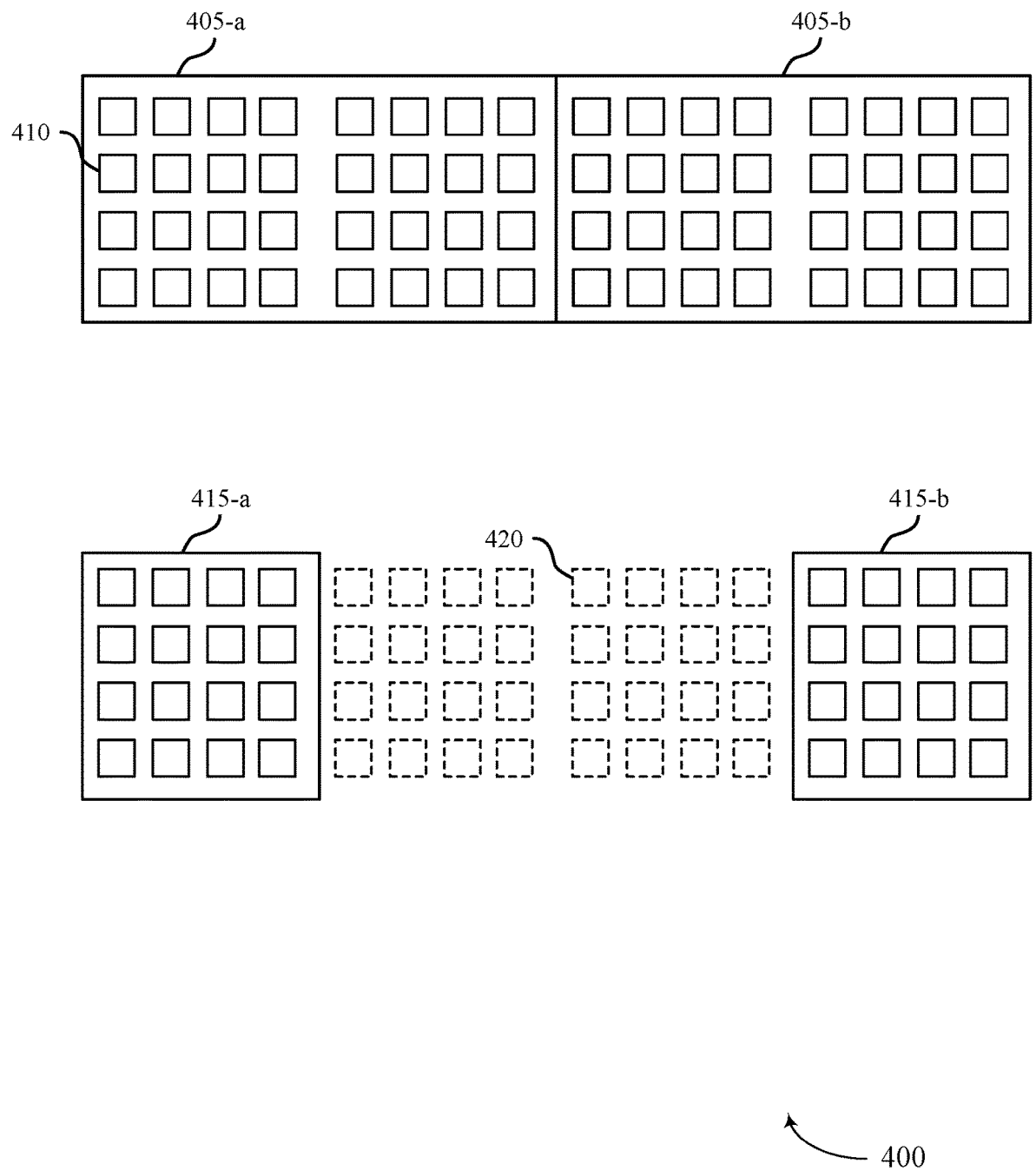
FIG. 4 illustrates an example antenna configuration that supports indication of asymmetric DOFs for bidirectional communications.

FIG. 4 illustrates an example of an antenna configuration 400 that supports indication of asymmetric DOFs for bidirectional communications. The antenna configuration 400 may implement aspects of wireless communications systems 100 and 200. For example, the antenna configuration 400 may support communication between a first device (for example, a UE 115) and a second device (for example, a base station 105). The antenna configuration 400 may be part of an antenna module described with reference to FIG. 3. In some examples, the antenna configuration 400 may include a first subarray 405-a and a second subarray 405-b. Additionally, the subarrays 405-a and 405-b may each include one or more antenna elements 410 for sending and receiving wireless signals. For example, as shown, each subarray 405 may include 32 antenna elements 410.

In some implementations (for example, in FR4, such as the 57-71 GHz band), the first device may use different subarrays for uplink and downlink transmissions. In some examples, the subarrays may be in the same module (for example, antenna module). In other cases, the subarrays used may be in different modules. For example, the first device may use the 64 antenna elements 410 of the first subarray 405-a and the second subarray 405-b for downlink transmissions and may use a first subarray 415-a and a second subarray 415-b (for example, with a different number of antenna elements 410) for uplink transmissions, and the subarrays 405 may be located in a same module or a different module as the subarrays 415. In some examples, the antenna elements 410 may have low noise amplifiers (LNAs) that cover the 57-71 GHz frequency band. Additionally, or alternatively, the first subarray 415-a may contain antenna elements which cover the 57-64 GHz band, while the second subarray 415-b may contain antenna elements which cover the 64-71 GHz band. In some examples, the module may contain a set of inactive antenna elements 420. For example, the first device may determine that beams constructed using one or more antenna elements of the set of inactive antenna elements 420 are obstructed and may determine to not use the set of inactive antenna elements 420 for neither uplink nor downlink transmissions.

In this example, uplink transmissions are covered with fewer active antenna elements than downlink transmissions. In some examples, the first device may determine to not use inactive antenna elements for uplink transmissions based on MPE requirements. For example, the first device may determine that an intensity level (for example, power intensity) of a transmission cannot exceed an MPE level to be considered safe. Because the intensity of uplink transmissions are regulated at the first device by compliance requirements (for example, transmission from the first device may use a high intensity to reach the second device with a strong signal), the first device may determine to use a portion of the first subarray 415-a and a portion of the subarray 415-b to reduce uplink transmission intensity. Additionally, the first device may determine to not use inactive antenna elements based on cost tradeoffs associated with some RF components that preclude their usage over some elements (for example, weak received signal from an antenna element, obstructions between an antenna element and a receiver, or similar scenarios).

In some examples, the DOF of a subarray may depend on spacing between elements. For example, the DOF of a node or device also may be referred to as a metric that captures the frequency whose half wavelength is equal to the inter-element spacing on an antenna array or panel in operation. That is, for some wavelength $\lambda$, an inter-element spacing may be $d=\lambda/2$ and the corresponding DOF may be equal to $c/\lambda=c/2d$, in which c refers to the speed of light. As such, an antenna panel of a device may have a DOF based on the designed or configured inter-element spacing of the antenna panel, and the device may adjust or tailor the DOF of the antenna panel based on configuring or tuning a radio frequency chain of the (coupled to) antenna array or panel.

The first device and second device may experience a greater likelihood for successful communications when the devices are using a same or similar DOF. Therefore, the first device may transmit an indication of its DOFs for uplink and downlink transmissions to the second device, so that the devices may make determinations based on the DOFs to improve wireless communications.

Figure 5:
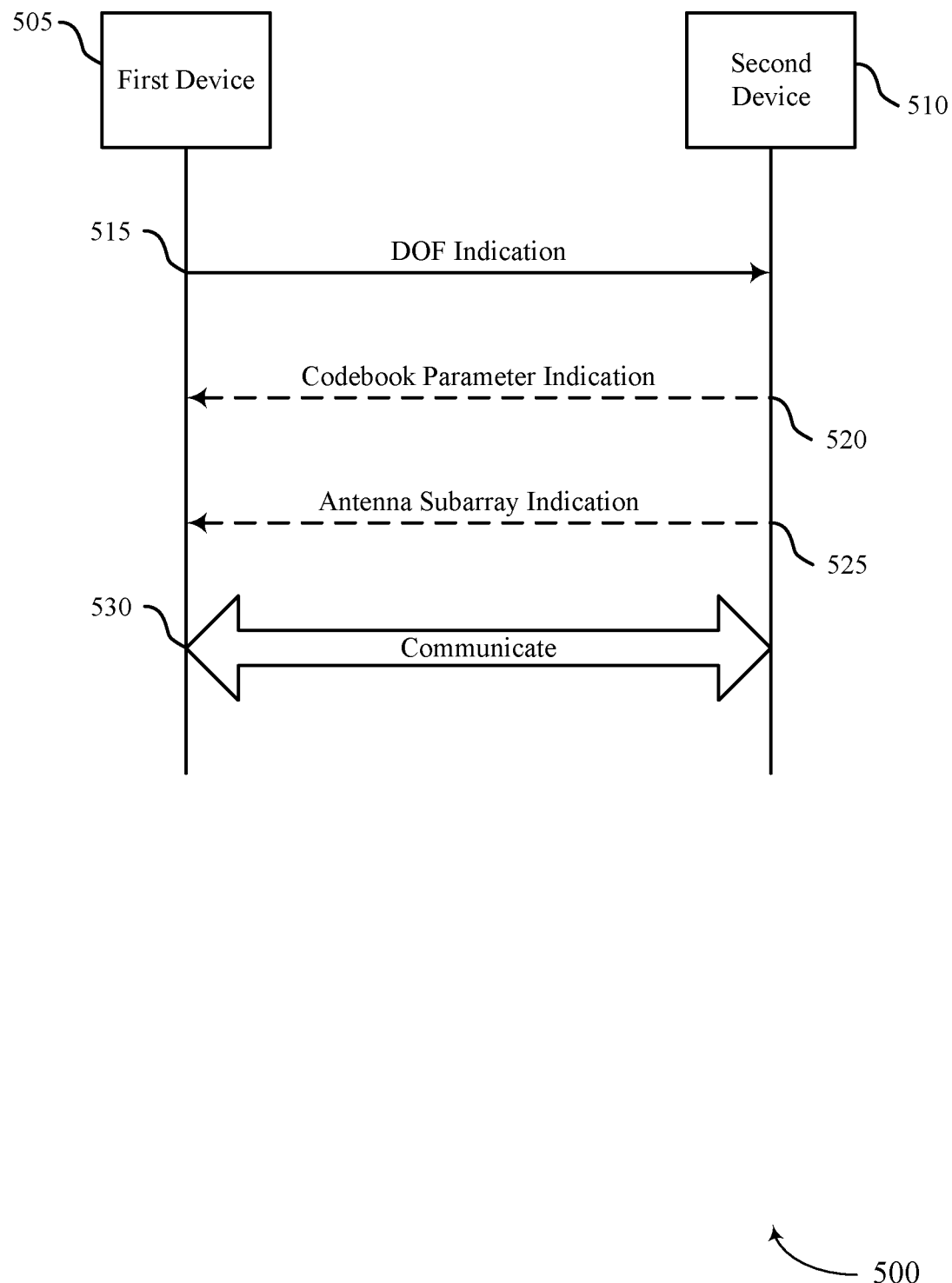
FIG. 5 illustrates an example process flow that supports indication of asymmetric DOFs for bidirectional communications.

FIG. 5 illustrates an example of a process flow 500 that supports indication of asymmetric DOFs for bidirectional communications. In some examples, the process flow 500 may be implemented by aspects of the wireless communications systems 100 and 200. The process flow 500 may relate to one or more actions performed by a first device 505 (for example, a first wireless device) and a second device 510 (for example, a second wireless device), which may be examples of base stations 105, UEs 115, CPE, TRPs, relay nodes, side link nodes, repeaters, IAB nodes, or a combination thereof, as described with reference to FIGS. 1-4. The process flow 500 also may involve one or more additional devices (not shown). Alternative examples of the following may be implemented, where some steps may be performed in a different order than described or may not be performed at all. In some examples, steps may include additional features not mentioned below, or further steps may be added.

At 515, the first device 505 may transmit to a second device 510 an indication of a first DOF for communications with the second device 510 in a first transmission direction, a second DOF for communications with the second device 510 in a second transmission direction, or both. In some examples, the first DOF may be different than the second DOF. In some other examples, the first DOF may be the same as the second DOF.

At 520, in response to the indication of the first DOF, the second DOF, or both, the second device 510 may transmit, to the first device 505, an indication of a first codebook parameter for the communications in the first transmission direction, a second codebook parameter for the communications in the second transmission direction, or both, the first codebook parameter corresponding to the first DOF and the second codebook parameter corresponding to the second DOF. In some examples, the first codebook parameter and the second codebook parameter may be selected or otherwise determined based on a difference between the first DOF and the second DOF satisfying a threshold.

At 525, in response to the indication of the first DOF, the second DOF, or both, the second device 510 may transmit, to the first device 505, an indication of a first antenna subarray for the first device 505 to use for the communications in the first transmission direction, a second antenna subarray for the first device 505 to use for the communications in the second transmission direction, or both, the first antenna subarray corresponding to the first DOF and the second antenna subarray corresponding to the second DOF. In some examples, the first antenna subarray and the second antenna subarray may be selected or otherwise determined based on a difference between the first DOF and the second DOF satisfying a threshold.

At 530, the first device 505 may communicate with the second device 510 in the first transmission direction on the first DOF, the second transmission direction on the second DOF, or both. In some example, the communications between the first device 5050 and the second device 510 may occur based on the indication of the codebook parameter(s), the antenna subarray(s), or both. Additionally, or alternatively, the first device 505 may communicate with the second device 510 in the first transmission direction on the first DOF using a first set of antenna elements, in the second transmission direction on the second DOF using a second set of antenna elements, or both. In such examples, the indication of the first DOF, and the second DOF, or both may include an indication of the first set of antenna elements and the second set of antenna elements. In some examples, the first set of antenna elements and the second set of antenna elements may at least partially overlap on a same antenna panel, the first set of antenna elements may be located on a first antenna panel and the second set of antenna elements may be located on a second antenna panel different than the first antenna panel, or a combination thereof.

Additionally, or alternatively, the first device 505 may communicate with the second device 510 in the first transmission direction on the first DOF using a first RF chain, in the second transmission direction on the second DOF using a second RF chain, or both. In such examples, the first RF chain may correspond to the first DOF, and the second RF chain may correspond to the second DOF.

In some examples, the second device 510 may communicate with the first device 505 according to a beam correspondence-based relationship between the communications in the first transmission direction and the communications in the second transmission direction. For example, the beam correspondence-based relationship may be identified, selected, or otherwise determined based on one or more of the first DOF being the same as the second DOF, a first resource allocation for the communications in the first transmission direction, or a second resource allocation for the communications in the second transmission direction (for example, if the frequencies for the first resource allocation and the second resource allocation are closely matched). Additionally, or alternatively, the second device 510 may communicate with the first device 505 in the first transmission direction on the first DOF using a first antenna panel, in the second transmission direction on the second DOF using a second antenna panel, or both. For example, the first antenna panel may correspond to the first DOF, and the second antenna panel may correspond to the second DOF.

Figure 6:
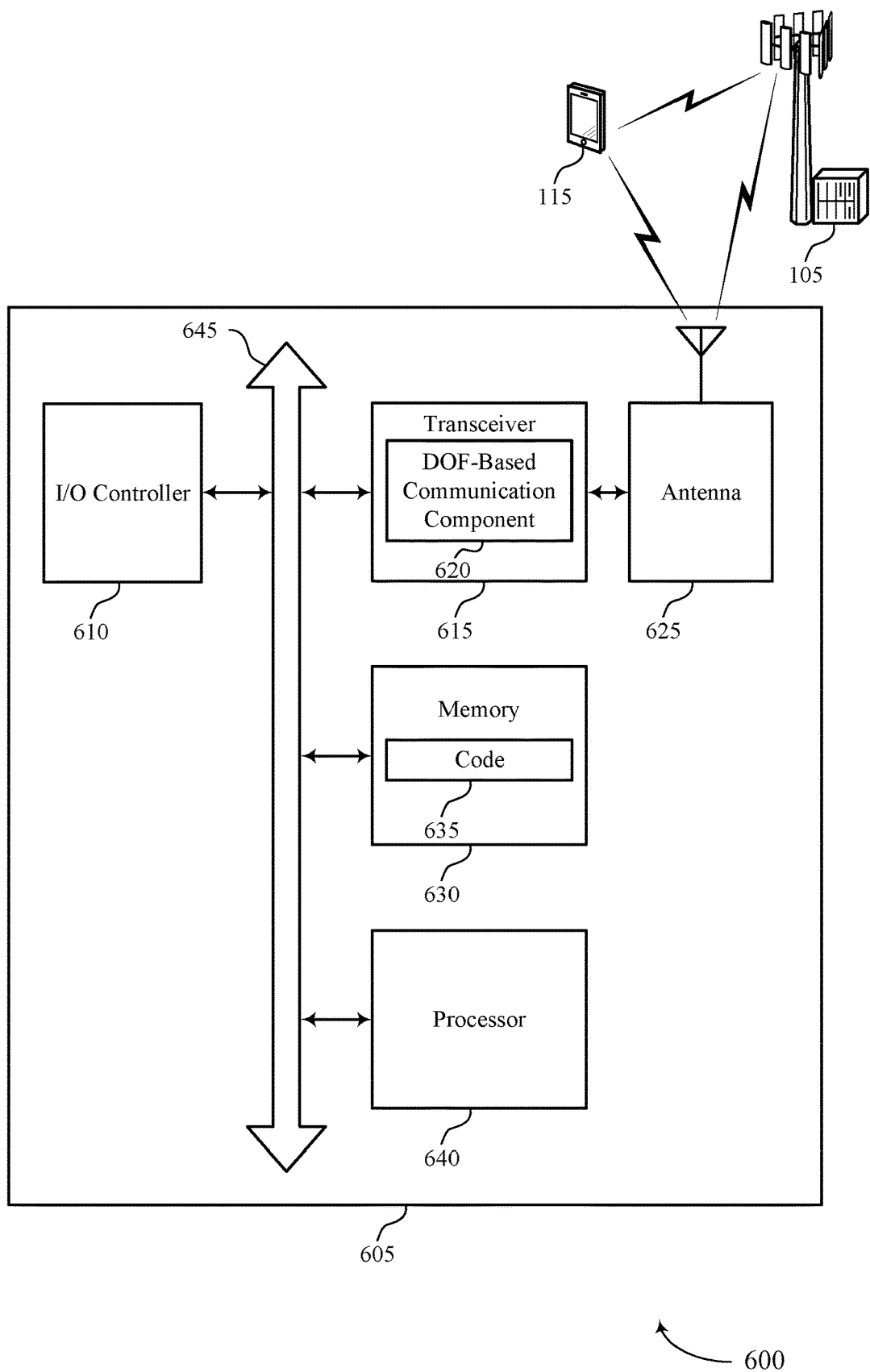
FIGS. 6 and 7 show example diagrams of systems including devices that support indication of asymmetric DOFs for bidirectional communications.

FIG. 6 shows a diagram of a system 600 including a device 605 that supports indication of asymmetric DOFs for bidirectional communications. The device 605 may be an example of or include the components of a device 605, a device 705, or a UE 115 as described herein. The device 605 may communicate wirelessly with one or more base stations 105, UEs 115, or any combination thereof. The device 605 may include components for bi-directional voice and data communications including components for transmitting and receiving communications, such as a DOF-based communication component 620, an input/output (I/O) controller 610, a transceiver 615, an antenna 625, a memory 630, code 635, and a processor 640. These components may be in electronic communication or otherwise coupled (for example, operatively, communicatively, functionally, electronically, electrically) via one or more buses (for example, a bus 645).

The I/O controller 610 may manage input and output signals for the device 605. The I/O controller 610 also may manage peripherals not integrated into the device 605. In some examples, the I/O controller 610 may represent a physical connection or port to an external peripheral. In some examples, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some examples, the I/O controller 610 may be implemented as part of a processor, such as the processor 640. In some examples, a user may interact with the device 605 via the I/O controller 610 or via hardware components controlled by the I/O controller 610.

In some examples, the device 605 may include a single antenna 625. However, in some other cases, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The transceiver 615, or the transceiver 615 and one or more antennas 625, may be an example of a transmitter or a receiver or any combination thereof or component thereof, as described herein.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some examples, the code 635 may not be directly executable by the processor 640 but may cause a computer (for example, when compiled and executed) to perform functions described herein. In some examples, the memory 630 may contain, among other things, a basic I/O system (BIOS) which may control basic hardware or software operation such as the interaction with peripheral components or devices.

The processor 640 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 640 may be configured to operate a memory array using a memory controller. In some other cases, a memory controller may be integrated into the processor 640. The processor 640 may be configured to execute computer-readable instructions stored in a memory (for example, the memory 630) to cause the device 605 to perform various functions (for example, functions or tasks supporting indication of asymmetric DOFs for bidirectional communications). For example, the device 605 or a component of the device 605 may include a processor 640 and memory 630 coupled to the processor 640, the processor 640 and memory 630 configured to perform various functions described herein.

The processor 640 may be any one or more suitable processors capable of executing scripts or instructions of one or more software programs stored in the device 605 (such as within the memory 630). For example, the processor 640 may execute the frame formation and exchange a software module to facilitate the creation and exchange of frames (such as management frames, control frames, and data frames). The processor 640 also may execute a band switching software module to facilitate switching the association of the device 605 between additional devices, or to facilitate switching the operation of the device 605 between different frequency bands, or both.

In some implementations, the processor 640 and the I/O controller 610 may be components of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605.

The processing system of the device 605 may interface with other components of the device 605, and may process information received from other components (such as inputs or signals), output information to other components, or both. For example, a chip or modem of the device 605 may include a processing system, a first interface to receive or obtain information, and a second interface to output, transmit or provide information. In some examples, the first interface may refer to an interface between the processing system of the chip or modem and a receiver, such that the device 605 may receive information or signal inputs, and the information may be passed to the processing system. In some examples, the second interface may refer to an interface between the processing system of the chip or modem and a transmitter, such that the device 605 may transmit information output from the chip or modem. A person having ordinary skill in the art will readily recognize that the second interface also may obtain or receive information or signal inputs, and the first interface also may output, transmit or provide information.

The DOF-based communication component 620 may support wireless communications. The DOF-based communication component 620 may be configured as or otherwise support a means for transmitting, by a first wireless device, an indication of a first DOF for communications with a second wireless device in a first transmission direction, a second DOF for communications with the second wireless device in a second transmission direction, or both. Additionally, the DOF-based communication component 620 may be configured as or otherwise support a means for communicating with the second wireless device in the first transmission direction on the first DOF, the second transmission direction on the second DOF, or both. In some examples, the first DOF may be different than the second DOF. Additionally, or alternatively, the first DOF may be the same as the second DOF.

In some examples, the DOF-based communication component 620 may be configured as or otherwise support a means for receiving, in response to the indication of the first DOF, the second DOF, or both, an indication of a first codebook parameter to use for the communications in the first transmission direction, a second codebook parameter to use for the communications in the second transmission direction, or both, where the communications with the second wireless device are based on receiving the indication of the first codebook parameter, the second codebook parameter, or both.

Additionally, or alternatively, the DOF-based communication component 620 may be configured as or otherwise support a means for receiving, in response to the indication of the first DOF, the second DOF, or both, an indication of a first antenna subarray to use for the communications in the first transmission direction, a second antenna subarray to use for the communications in the second transmission direction, or both, where the communications with the second wireless device are based on receiving the indication of the first antenna subarray, the second antenna subarray, or both.

In some examples, to support communicating with the second wireless device, the DOF-based communication component 620 may be configured as or otherwise support a means for communicating with the second wireless device in the first transmission direction on the first DOF using a first set of antenna elements, in the second transmission direction on the second DOF using a second set of antenna elements, or both, where the indication of the first DOF, the second DOF, or both includes an indication of the first set of antenna elements and the second set of antenna elements. In some examples, the first set of antenna elements and the second set of antenna elements may at least partially overlap on a same antenna panel, the first set of antenna elements may be located on a first antenna panel and the second set of antenna elements may be located on a second antenna panel different than the first antenna panel, or a combination thereof.

In some examples, to support communicating with the second wireless device, the DOF-based communication component 620 may be configured as or otherwise support a means for communicating with the second wireless device in the first transmission direction on the first DOF using a first RF chain, in the second transmission direction on the second DOF using a second RF chain, or both, where the first RF chain corresponds to the first DOF and the second RF chain is corresponds to the second DOF.

Additionally, or alternatively, the communications manager 820 may support additional wireless communications. For example, the DOF-based communication component 620 may be configured as or otherwise support a means for receiving an indication of a first DOF for communications with a first wireless device in a first transmission direction, a second DOF for communications with the first wireless device in a second transmission direction, or both. Additionally, the DOF-based communication component 620 may be configured as or otherwise support a means for communicating with the first wireless device according to one or more transmission parameters corresponding to the first DOF, the second DOF, or both. In some examples, the first DOF is different than the second DOF. Additionally, or alternatively, the first DOF is the same as the second DOF.

In some examples, the DOF-based communication component 620 may be configured as or otherwise support a means for transmitting, to the first wireless device, an indication of a first codebook parameter for the communications in the first transmission direction, a second codebook parameter for the communications in the second transmission direction, or both, the first codebook parameter corresponding to the first DOF and the second codebook parameter corresponding to the second DOF, where the first codebook parameter and the second codebook parameter are determined based on a difference between the first DOF and the second DOF satisfying a threshold.

Additionally, or alternatively, the DOF-based communication component 620 may be configured as or otherwise support a means for transmitting, to the first wireless device, an indication of a first antenna subarray for the first wireless device to use for the communications in the first transmission direction, a second antenna subarray for the first wireless device to use for the communications in the second transmission direction, or both, the first antenna subarray corresponding to the first DOF and the second antenna subarray corresponding to the second DOF, where the first antenna subarray and the second antenna subarray are determined based on a difference between the first DOF and the second DOF satisfying a threshold.

In some examples, to support communicating with the first wireless device, the DOF-based communication component 620 may be configured as or otherwise support a means for communicating with the first wireless device according to a beam correspondence-based relationship between the communications in the first transmission direction and the communications in the second transmission direction, where the beam correspondence-based relationship is determined based on one or more of the first DOF being the same as the second DOF, a first resource allocation for the communications in the first transmission direction, or a second resource allocation for the communications in the second transmission direction.

Additionally, or alternatively, to support communicating with the first wireless device, the DOF-based communication component 620 may be configured as or otherwise support a means for communicating with the first wireless device in the first transmission direction on the first DOF using a first antenna panel, in the second transmission direction on the second DOF using a second antenna panel, or both, the first antenna panel corresponding to the first DOF and the second antenna panel corresponding to the second DOF.

In some examples, the DOF-based communication component 620 may be configured to perform various operations (for example, receiving, monitoring, transmitting) using or otherwise in cooperation with the transceiver 615, the one or more antennas 625, or any combination thereof. Although the DOF-based communication component 620 is illustrated as a separate component, in some examples, one or more functions described with reference to the DOF-based communication component 620 may be supported by or performed by the processor 640, the memory 630, the code 635, or any combination thereof. For example, the code 635 may include instructions executable by the processor 640 to cause the device 605 to perform various aspects of indication of asymmetric DOFs for bidirectional communications as described herein, or the processor 640 and the memory 630 may be otherwise configured to perform or support such operations.

Figure 7:
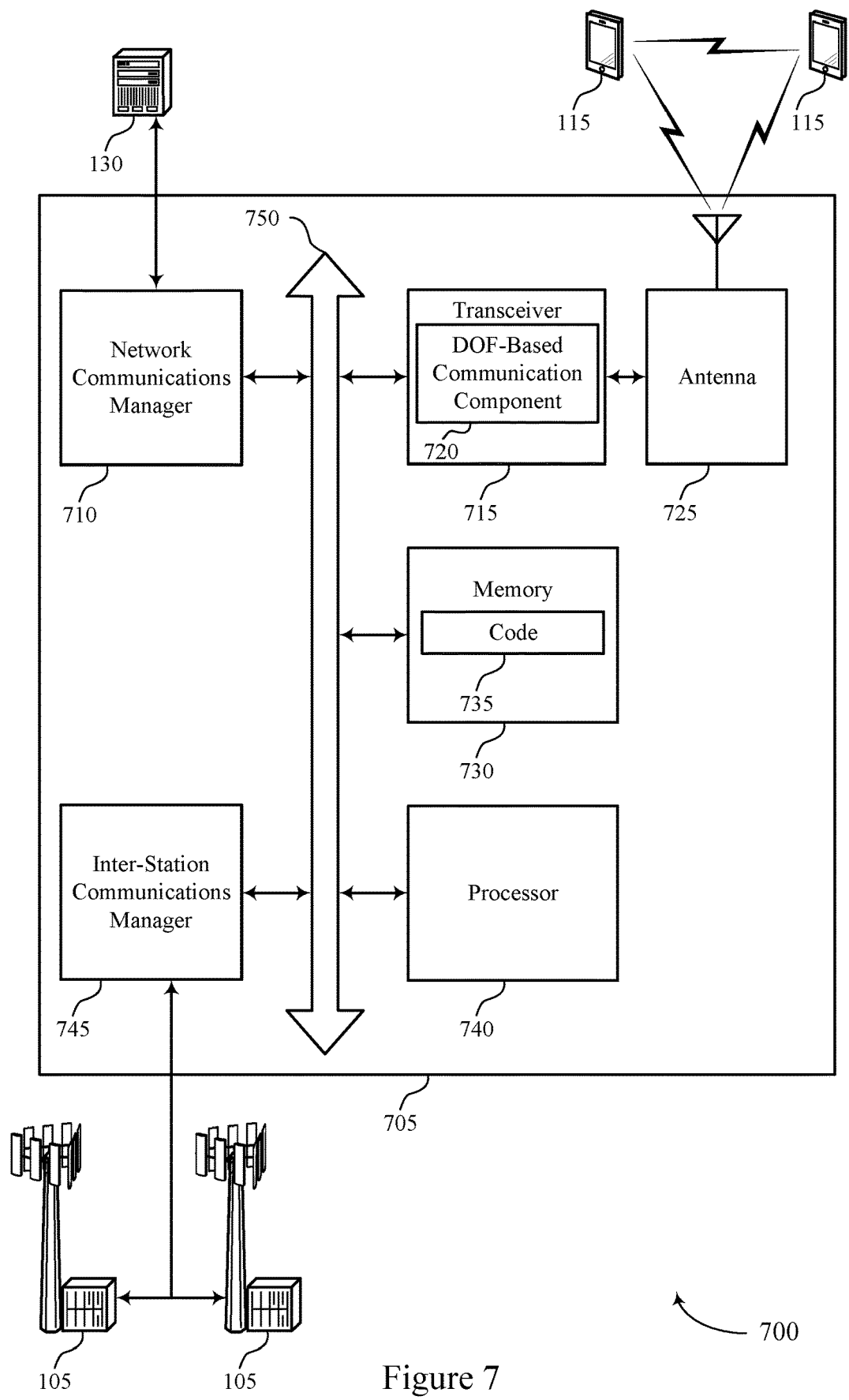

FIG. 7 shows a diagram of a system 700 including a device 705 that supports indication of asymmetric DOFs for bidirectional communications. The device 705 may be an example of or include the components of a device 605, a device 705, or a base station 105 as described herein. The device 705 may communicate wirelessly with one or more base stations 105, UEs 115, or any combination thereof. The device 705 may include components for bi-directional voice and data communications including components for transmitting and receiving communications, such as a DOF-based communication component 720, a network communications manager 710, a transceiver 715, an antenna 725, a memory 730, code 735, a processor 740, and an inter-station communications manager 745. These components may be in electronic communication or otherwise coupled (for example, operatively, communicatively, functionally, electronically, electrically) via one or more buses (for example, a bus 750).

The network communications manager 710 may manage communications with a core network 130 (for example, via one or more wired backhaul links). For example, the network communications manager 710 may manage the transfer of data communications for client devices, such as one or more UEs 115.

In some examples, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter, a receiver, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some examples, the code 735 may not be directly executable by the processor 740 but may cause a computer (for example, when compiled and executed) to perform functions described herein. In some examples, the memory 730 may contain, among other things, a BIOS which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting indication of asymmetric DOFs for bidirectional communications). For example, the device 705 or a component of the device 705 may include a processor 740 and memory 730 coupled to the processor 740, the processor 740 and memory 730 configured to perform various functions described herein.

The processor 740 may be any one or more suitable processors capable of executing scripts or instructions of one or more software programs stored in the device 705 (such as within the memory 730). For example, the processor 740 may execute the frame formation and exchange a software module to facilitate the creation and exchange of frames (such as management frames, control frames, and data frames). The processor 740 also may execute a band switching software module to facilitate switching the association of the device 705 between additional devices, or to facilitate switching the operation of the device 705 between different frequency bands, or both.

In some implementations, the processor 740 and the network communications manager 710 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705.

The processing system of the device 705 may interface with other components of the device 705, and may process information received from other components (such as inputs or signals), output information to other components, or both. For example, a chip or modem of the device 705 may include a processing system, a first interface to receive or obtain information, and a second interface to output, transmit or provide information. In some examples, the first interface may refer to an interface between the processing system of the chip or modem and a receiver, such that the device 705 may receive information or signal inputs, and the information may be passed to the processing system. In some examples, the second interface may refer to an interface between the processing system of the chip or modem and a transmitter, such that the device 705 may transmit information output from the chip or modem. A person having ordinary skill in the art will readily recognize that the second interface also may obtain or receive information or signal inputs, and the first interface also may output, transmit or provide information.

The DOF-based communication component 720 may support wireless communications. The DOF-based communication component 720 may be configured as or otherwise support a means for transmitting, by a first wireless device, an indication of a first DOF for communications with a second wireless device in a first transmission direction, a second DOF for communications with the second wireless device in a second transmission direction, or both. Additionally, the DOF-based communication component 720 may be configured as or otherwise support a means for communicating with the second wireless device in the first transmission direction on the first DOF, the second transmission direction on the second DOF, or both. In some examples, the first DOF may be different than the second DOF. Additionally, or alternatively, the first DOF may be the same as the second DOF.

In some examples, the DOF-based communication component 720 may be configured as or otherwise support a means for receiving, in response to the indication of the first DOF, the second DOF, or both, an indication of a first codebook parameter to use for the communications in the first transmission direction, a second codebook parameter to use for the communications in the second transmission direction, or both, where the communications with the second wireless device are based on receiving the indication of the first codebook parameter, the second codebook parameter, or both.

Additionally, or alternatively, the DOF-based communication component 720 may be configured as or otherwise support a means for receiving, in response to the indication of the first DOF, the second DOF, or both, an indication of a first antenna subarray to use for the communications in the first transmission direction, a second antenna subarray to use for the communications in the second transmission direction, or both, where the communications with the second wireless device are based on receiving the indication of the first antenna subarray, the second antenna subarray, or both.

In some examples, to support communicating with the second wireless device, the DOF-based communication component 720 may be configured as or otherwise support a means for communicating with the second wireless device in the first transmission direction on the first DOF using a first set of antenna elements, in the second transmission direction on the second DOF using a second set of antenna elements, or both, where the indication of the first DOF, the second DOF, or both includes an indication of the first set of antenna elements and the second set of antenna elements. In some examples, the first set of antenna elements and the second set of antenna elements may at least partially overlap on a same antenna panel, the first set of antenna elements may be located on a first antenna panel and the second set of antenna elements may be located on a second antenna panel different than the first antenna panel, or a combination thereof.

In some examples, to support communicating with the second wireless device, the DOF-based communication component 720 may be configured as or otherwise support a means for communicating with the second wireless device in the first transmission direction on the first DOF using a first RF chain, in the second transmission direction on the second DOF using a second RF chain, or both, where the first RF chain corresponds to the first DOF and the second RF chain is corresponds to the second DOF.

Additionally, or alternatively, the communications manager 820 may support additional wireless communications. For example, the DOF-based communication component 720 may be configured as or otherwise support a means for receiving an indication of a first DOF for communications with a first wireless device in a first transmission direction, a second DOF for communications with the first wireless device in a second transmission direction, or both. Additionally, the DOF-based communication component 720 may be configured as or otherwise support a means for communicating with the first wireless device according to one or more transmission parameters corresponding to the first DOF, the second DOF, or both. In some examples, the first DOF is different than the second DOF. Additionally, or alternatively, the first DOF is the same as the second DOF.

In some examples, the DOF-based communication component 720 may be configured as or otherwise support a means for transmitting, to the first wireless device, an indication of a first codebook parameter for the communications in the first transmission direction, a second codebook parameter for the communications in the second transmission direction, or both, the first codebook parameter corresponding to the first DOF and the second codebook parameter corresponding to the second DOF, where the first codebook parameter and the second codebook parameter are determined based on a difference between the first DOF and the second DOF satisfying a threshold.

Additionally, or alternatively, the DOF-based communication component 720 may be configured as or otherwise support a means for transmitting, to the first wireless device, an indication of a first antenna subarray for the first wireless device to use for the communications in the first transmission direction, a second antenna subarray for the first wireless device to use for the communications in the second transmission direction, or both, the first antenna subarray corresponding to the first DOF and the second antenna subarray corresponding to the second DOF, where the first antenna subarray and the second antenna subarray are determined based on a difference between the first DOF and the second DOF satisfying a threshold.

In some examples, to support communicating with the first wireless device, the DOF-based communication component 720 may be configured as or otherwise support a means for communicating with the first wireless device according to a beam correspondence-based relationship between the communications in the first transmission direction and the communications in the second transmission direction, where the beam correspondence-based relationship is determined based on one or more of the first DOF being the same as the second DOF, a first resource allocation for the communications in the first transmission direction, or a second resource allocation for the communications in the second transmission direction.

Additionally, or alternatively, to support communicating with the first wireless device, the DOF-based communication component 720 may be configured as or otherwise support a means for communicating with the first wireless device in the first transmission direction on the first DOF using a first antenna panel, in the second transmission direction on the second DOF using a second antenna panel, or both, the first antenna panel corresponding to the first DOF and the second antenna panel corresponding to the second DOF.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

In some examples, the DOF-based communication component 720 may be configured to perform various operations (for example, receiving, monitoring, transmitting) using or otherwise in cooperation with the transceiver 715, the one or more antennas 725, or any combination thereof. Although the DOF-based communication component 720 is illustrated as a separate component, in some examples, one or more functions described with reference to the DOF-based communication component 720 may be supported by or performed by the processor 740, the memory 730, the code 735, or any combination thereof. For example, the code 735 may include instructions executable by the processor 740 to cause the device 705 to perform various aspects of indication of asymmetric DOFs for bidirectional communications as described herein, or the processor 740 and the memory 730 may be otherwise configured to perform or support such operations.

Figure 8:
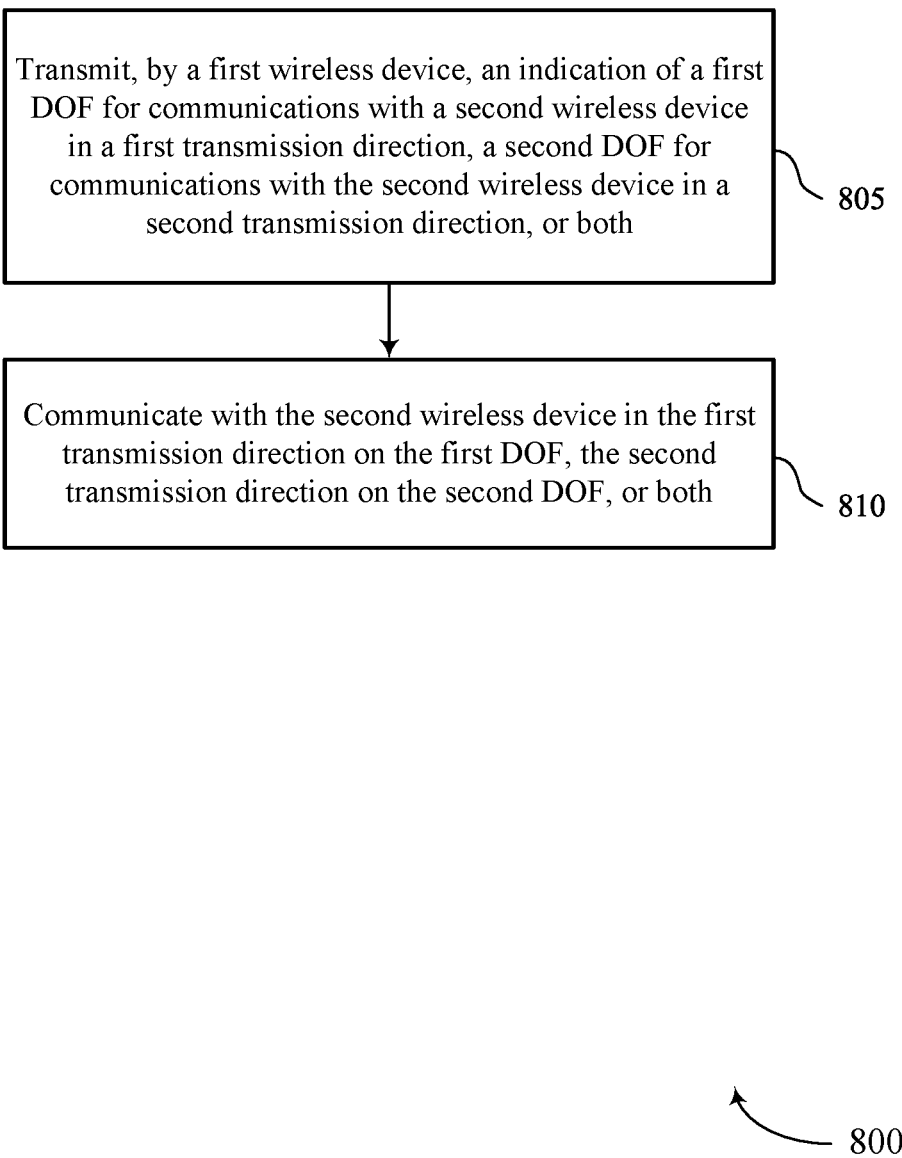
FIGS. 8 and 9 show example flowcharts illustrating methods that support indication of asymmetric DOFs for bidirectional communications.

FIG. 8 shows a flowchart illustrating a method 800 that supports indication of asymmetric DOFs for bidirectional communications. The operations of the method 800 may be implemented by a UE or a base station or its components as described herein. For example, the operations of the method 800 may be performed by a UE 115 or a base station 105 as described with reference to FIGS. 1-7. In some examples, a UE or a base station may execute a set of instructions to control the functional elements of the UE or the base station to perform the described functions. Additionally, or alternatively, the UE or the base station may perform aspects of the described functions using special-purpose hardware.

At 805, the method may include transmitting, by a first wireless device, an indication of a first DOF for communications with a second wireless device in a first transmission direction, a second DOF for communications with the second wireless device in a second transmission direction, or both. In some examples, aspects of the operations of 805 may be performed by a DOF-based communication component 620 or 720 as described with reference to FIGS. 6 and 7.

At 810, the method may include communicating with the second wireless device in the first transmission direction on the first DOF, the second transmission direction on the second DOF, or both. In some examples, aspects of the operations of 810 may be performed by a DOF-based communication component 620 or 720 as described with reference to FIGS. 6 and 7.

Figure 9:
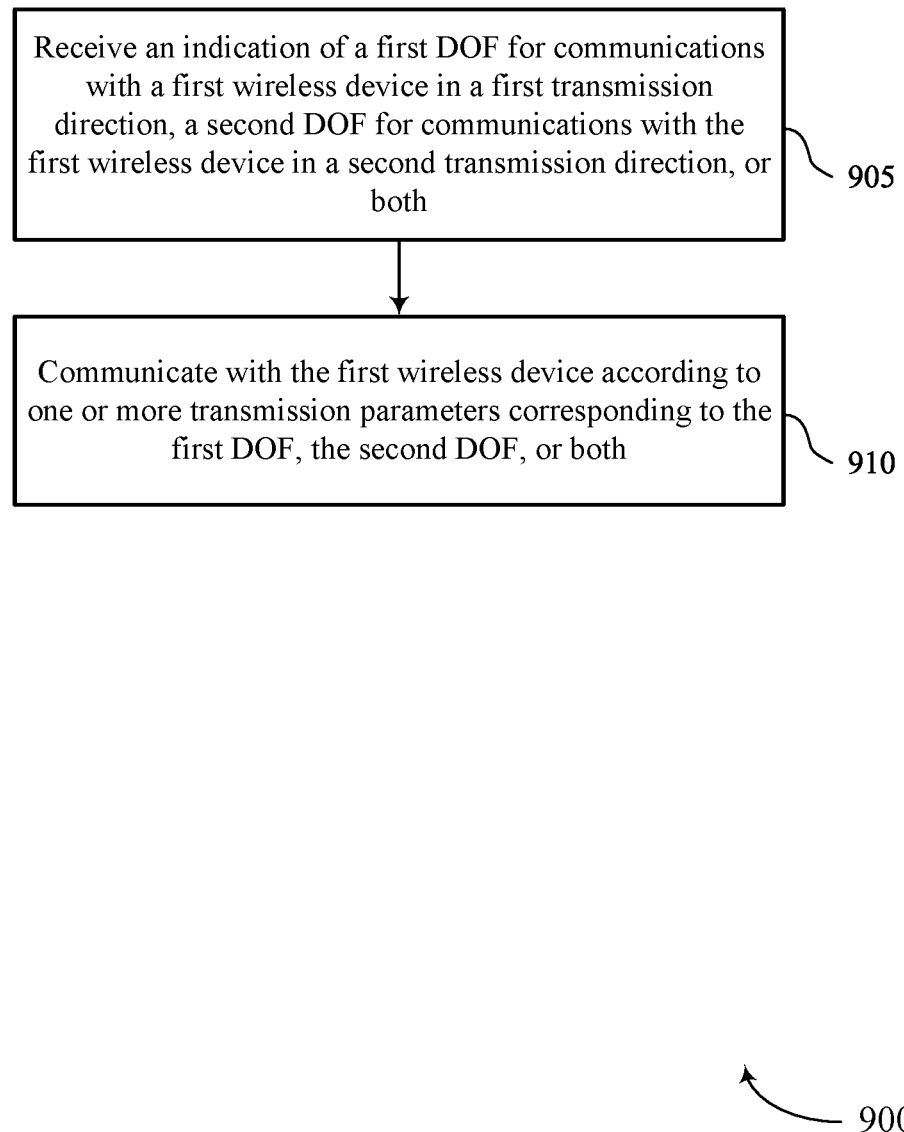

FIG. 9 shows a flowchart illustrating a method 900 that supports indication of asymmetric DOFs for bidirectional communications. The operations of the method 900 may be implemented by a UE or a base station or its components as described herein. For example, the operations of the method 900 may be performed by a first device (for example, UE 115 or a base station 105 as described with reference to FIGS. 1-7. In some examples, a UE or a base station may execute a set of instructions to control the functional elements of the UE or the base station to perform the described functions. Additionally, or alternatively, the UE or the base station may perform aspects of the described functions using special-purpose hardware.

At 905, the method may include receiving an indication of a first DOF for communications with a first wireless device in a first transmission direction, a second DOF for communications with the first wireless device in a second transmission direction, or both. In some examples, aspects of the operations of 905 may be performed by a DOF-based communication component 620 or 720 as described with reference to FIGS. 6 and 7.

At 910, the method may include communicating with the first wireless device according to one or more transmission parameters corresponding to the first DOF, the second DOF, or both. In some examples, aspects of the operations of 910 may be performed by a DOF-based communication component 620 or 720 as described with reference to FIGS. 6 and 7.

The following provides an overview of some aspects of the present disclosure:

Aspect 1: A method for wireless communications, including: transmitting, by a first wireless device, an indication of: a first default operating frequency for communications with a second wireless device in a first transmission direction, a second default operating frequency for communications with the second wireless device in a second transmission direction, or both; and communicating with the second wireless device in the first transmission direction on the first default operating frequency, the second transmission direction on the second default operating frequency, or both.

Aspect 2: The method of aspect 1, further including: receiving, in response to the indication of the first default operating frequency, the second default operating frequency, or both, an indication of a first codebook parameter to use for the communications in the first transmission direction, a second codebook parameter to use for the communications in the second transmission direction, or both, where the communications with the second wireless device are based at least in part on receiving the indication of the first codebook parameter, the second codebook parameter, or both.

Aspect 3: The method of any of aspects 1 through 2, further including: receiving, in response to the indication of the first default operating frequency, the second default operating frequency, or both, an indication of a first antenna subarray to use for the communications in the first transmission direction, a second antenna subarray to use for the communications in the second transmission direction, or both, where the communications with the second wireless device are based at least in part on receiving the indication of the first antenna subarray, the second antenna subarray, or both.

Aspect 4: The method of any of aspects 1 through 3, where communicating with the second wireless device includes: communicating with the second wireless device in the first transmission direction on the first default operating frequency using a first set of antenna elements, in the second transmission direction on the second default operating frequency using a second set of antenna elements, or both, where the indication of the first default operating frequency, the second default operating frequency, or both includes an indication of the first set of antenna elements and the second set of antenna elements.

Aspect 5: The method of aspect 4, where the first set of antenna elements and the second set of antenna elements at least partially overlap on a same antenna panel, the first set of antenna elements are located on a first antenna panel and the second set of antenna elements are located on a second antenna panel different than the first antenna panel, or a combination thereof Aspect 6: The method of any of aspects 1 through 5, where communicating with the second wireless device includes: communicating with the second wireless device in the first transmission direction on the first default operating frequency using a first radio frequency (RF) chain, in the second transmission direction on the second default operating frequency using a second RF chain, or both, where the first RF chain corresponds to the first default operating frequency and the second RF chain is corresponds to the second default operating frequency.

Aspect 7: The method of any of aspects 1 through 6, where the first default operating frequency is different than the second default operating frequency.

Aspect 8: The method of any of aspects 1 through 6, where the first default operating frequency is the same as the second default operating frequency.

Aspect 9: A method for wireless communications, including: receiving an indication of a: first default operating frequency for communications with a first wireless device in a first transmission direction, a second default operating frequency for communications with the first wireless device in a second transmission direction, or both; and communicating with the first wireless device according to one or more transmission parameters corresponding to the first default operating frequency, the second default operating frequency, or both.

Aspect 10: The method of aspect 9, further including: transmitting, to the first wireless device, an indication of a first codebook parameter for the communications in the first transmission direction, a second codebook parameter for the communications in the second transmission direction, or both, the first codebook parameter corresponding to the first default operating frequency and the second codebook parameter corresponding to the second default operating frequency, where the first codebook parameter and the second codebook parameter are determined based at least in part on a difference between the first default operating frequency and the second default operating frequency satisfying a threshold.

Aspect 11: The method of any of aspects 9 through 10, further including: transmitting, to the first wireless device, an indication of a first antenna subarray for the first wireless device to use for the communications in the first transmission direction, a second antenna subarray for the first wireless device to use for the communications in the second transmission direction, or both, the first antenna subarray corresponding to the first default operating frequency and the second antenna subarray corresponding to the second default operating frequency, where the first antenna subarray and the second antenna subarray are determined based at least in part on a difference between the first default operating frequency and the second default operating frequency satisfying a threshold.

Aspect 12: The method of any of aspects 9 through 11, where communicating with the first wireless device includes: communicating with the first wireless device according to a beam correspondence-based relationship between the communications in the first transmission direction and the communications in the second transmission direction, where the beam correspondence-based relationship is determined based at least in part on one or more of the first default operating frequency being the same as the second default operating frequency, a first resource allocation for the communications in the first transmission direction, or a second resource allocation for the communications in the second transmission direction.

Aspect 13: The method of any of aspects 9 through 12, where communicating with the first wireless device includes: communicating with the first wireless device in the first transmission direction on the first default operating frequency using a first antenna panel, in the second transmission direction on the second default operating frequency using a second antenna panel, or both, the first antenna panel corresponding to the first default operating frequency and the second antenna panel corresponding to the second default operating frequency.

Aspect 14: The method of any of aspects 9 through 13, where the first default operating frequency is different than the second default operating frequency.

Aspect 15: The method of any of aspects 9 through 13, where the first default operating frequency is the same as the second default operating frequency.

Aspect 16: An apparatus for wireless communications at a first wireless device, including at least a first interface and a second interface configured to cause the apparatus to perform a method of any of aspects 1 through 8.

Aspect 17: An apparatus for wireless communications, including at least one means for performing a method of any of aspects 1 through 8.

Aspect 18: A non-transitory computer-readable medium storing code for wireless communications, the code including instructions executable by a processor to perform a method of any of aspects 1 through 8.

Aspect 19: An apparatus for wireless communications, including at least a first interface and a second interface configured to cause the apparatus to perform a method of any of aspects 9 through 15.

Aspect 20: An apparatus for wireless communications, including at least one means for performing a method of any of aspects 9 through 15.

Aspect 21: A non-transitory computer-readable medium storing code for wireless communications, the code including instructions executable by a processor to perform a method of any of aspects 9 through 15.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, an FPGA or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. A wireless device, comprising:
    at least one memory; and
    at least one processor communicatively coupled with the at least one memory, the at least one processor operable to cause the wireless device to:
        transmit an indication of a first default operating frequency associated with communications in a first transmission direction and a second default operating frequency associated with communications in a second transmission direction;
        transmit one or more first messages in the first transmission direction using the first default operating frequency and a first set of antenna elements of the wireless device, wherein the first default operating frequency is associated with a first inter-element spacing of the first set of antenna elements; and
        receive one or more second messages in the second transmission direction using the second default operating frequency and a second set of antenna elements of the wireless device, wherein the second default operating frequency is associated with a second inter-element spacing of the second set of antenna elements.

2. The wireless device of claim 1, wherein the at least one processor is further operable to cause the wireless device to:
    receive, in accordance with the indication of the first default operating frequency and the second default operating frequency, an indication of a first codebook parameter associated with the communications in the first transmission direction or a second codebook parameter associated with the communications in the second transmission direction, or both.

3. The wireless device of claim 2, wherein the first codebook parameter corresponds to the first default operating frequency and the second codebook parameter corresponds to the second default operating frequency, and wherein receiving the indication of the first codebook parameter and the second codebook parameter is based at least in part on a difference between the first default operating frequency and the second default operating frequency satisfying a threshold frequency.

4. The wireless device of claim 1, wherein the at least one processor is further operable to cause the wireless device to:
    receive, in accordance with the indication of the first default operating frequency and the second default operating frequency, an indication of a first antenna subarray associated with the communications in the first transmission direction and a second antenna subarray associated with the communications in the second transmission direction.

5. The wireless device of claim 4, wherein the first antenna subarray corresponds to the first default operating frequency and the second antenna subarray corresponds to the second default operating frequency, and wherein receiving the indication of the first antenna subarray and the second antenna subarray is based at least in part on a difference between the first default operating frequency and the second default operating frequency satisfying a threshold frequency.

6. The wireless device of claim 1, wherein the at least one processor is further operable to cause the wireless device to:
    select the first set of antenna elements as a subset of the second set of antenna elements based at least in part on one or more of a power consumption, a thermal limitation, or a maximum permissible exposure limitation associated with the wireless device.

7. The wireless device of claim 1, wherein the first set of antenna elements is associated with a first radio frequency chain and the second set of antenna elements is associated with a second radio frequency chain, and wherein the first radio frequency chain corresponds to the first default operating frequency and the second radio frequency chain corresponds to the second default operating frequency.

8. The wireless device of claim 1, wherein the indication of the first default operating frequency and the second default operating frequency includes an indication of the first set of antenna elements and the second set of antenna elements.

9. The wireless device of claim 1, wherein the first transmission direction is uplink and the second transmission direction is downlink.

10. A wireless device, comprising:
    at least one memory; and
    at least one processor communicatively coupled with the at least one memory, the at least one processor operable to cause the wireless device to:
        receive an indication of a first default operating frequency associated with communications with a second wireless device in a first transmission direction and a second default operating frequency associated with communications with the second wireless device in a second transmission direction, wherein the first default operating frequency is associated with a first inter-element spacing of a first set of antenna elements of the second wireless device and the second default operating frequency is associated with a second inter-element spacing of a second set of antenna elements of the second wireless device;
        receive one or more first messages in the first transmission direction using the first default operating frequency; and transmit one or more second messages in the second transmission direction using the second default operating frequency.

11. The wireless device of claim 10, wherein the at least one processor is further operable to cause the wireless device to:
transmit, in accordance with the indication of the first default operating frequency and the second default operating frequency, an indication of a first codebook parameter associated with the communications in the first transmission direction or a second codebook parameter associated with the communications in the second transmission direction, or both.

12. The wireless device of claim 11, wherein the first codebook parameter corresponds to the first default operating frequency and the second codebook parameter corresponds to the second default operating frequency, and wherein transmitting the indication of the first codebook parameter and the second codebook parameter is based at least in part on a difference between the first default operating frequency and the second default operating frequency satisfying a threshold frequency.

13. The wireless device of claim 10, wherein the at least one processor is further operable to cause the wireless device to:
transmit, in accordance with the indication of the first default operating frequency and the second default operating frequency, an indication of a first antenna subarray of the second wireless device associated with the communications in the first transmission direction and a second antenna subarray of the second wireless device associated with the communications in the second transmission direction.

14. The wireless device of claim 13, wherein the first antenna subarray of the second wireless device corresponds to the first default operating frequency and the second antenna subarray of the second wireless device corresponds to the second default operating frequency, and wherein transmitting the indication of the first antenna subarray and the second antenna subarray is based at least in part on a difference between the first default operating frequency and the second default operating frequency satisfying a threshold frequency.

15. The wireless device of claim 10, wherein the first set of antenna elements is a subset of the second set of antenna elements based at least in part on one or more of a power consumption, a thermal limitation, or a maximum permissible exposure limitation associated with the second wireless device.

16. The wireless device of claim 10, wherein the first set of antenna elements is associated with a first radio frequency chain of the second wireless device and the second set of antenna elements is associated with a second radio frequency chain of the second wireless device, and wherein the first radio frequency chain corresponds to the first default operating frequency and the second radio frequency chain corresponds to the second default operating frequency.

17. The wireless device of claim 10, wherein the indication of the first default operating frequency and the second default operating frequency includes an indication of the first set of antenna elements and the second set of antenna elements.

18. The wireless device of claim 10, wherein the first transmission direction is uplink and the second transmission direction is downlink.

19. A method for wireless communication performable at a wireless device, comprising:
transmitting an indication of a first default operating frequency associated with communications in a first transmission direction and a second default operating frequency associated with communications in a second transmission direction;
transmitting one or more first messages in the first transmission direction using the first default operating frequency and a first set of antenna elements of the wireless device, wherein the first default operating frequency is associated with a first inter-element spacing of the first set of antenna elements; and
receiving one or more second messages in the second transmission direction using the second default operating frequency and a second set of antenna elements of the wireless device, wherein the second default operating frequency is associated with a second inter-element spacing of the second set of antenna elements.

20. The method of claim 19, further comprising:
receiving, in accordance with the indication of the first default operating frequency and the second default operating frequency, an indication of a first codebook parameter associated with the communications in the first transmission direction or a second codebook parameter associated with the communications in the second transmission direction, or both.

21. The method of claim 19, further comprising:
receiving, in accordance with the indication of the first default operating frequency and the second default operating frequency, an indication of a first antenna subarray associated with the communications in the first transmission direction and a second antenna subarray associated with the communications in the second transmission direction.

22. The method of claim 19, further comprising:
selecting the first set of antenna elements as a subset of the second set of antenna elements based at least in part on one or more of a power consumption, a thermal limitation, or a maximum permissible exposure limitation associated with the wireless device.

23. The method of claim 19, wherein the first set of antenna elements is associated with a first radio frequency chain and the second set of antenna elements is associated with a second radio frequency chain, and wherein the first radio frequency chain corresponds to the first default operating frequency and the second radio frequency chain corresponds to the second default operating frequency.

24. A method for wireless communication performable at a wireless device, comprising:
receiving an indication of a first default operating frequency associated with communications with a second wireless device in a first transmission direction and a second default operating frequency associated with communications with the second wireless device in a second transmission direction, wherein the first default operating frequency is associated with a first inter-element spacing of a first set of antenna elements of the second wireless device and the second default operating frequency is associated with a second inter-element spacing of a second set of antenna elements of the second wireless device;
receiving one or more first messages in the first transmission direction using the first default operating frequency; and
transmitting one or more second messages in the second transmission direction using the second default operating frequency.

25. The method of claim 24, further comprising:
transmitting, in accordance with the indication of the first default operating frequency and the second default operating frequency, an indication of a first codebook parameter associated with the communications in the first transmission direction or a second codebook parameter associated with the communications in the second transmission direction, or both.

26. The method of claim 24, further comprising:
transmitting, in accordance with the indication of the first default operating frequency and the second default operating frequency, an indication of a first antenna subarray of the second wireless device associated with the communications in the first transmission direction and a second antenna subarray of the second wireless device associated with the communications in the second transmission direction.

27. The method of claim 24, wherein the first set of antenna elements is a subset of the second set of antenna elements based at least in part on one or more of a power consumption, a thermal limitation, or a maximum permissible exposure limitation associated with the second wireless device.

* * * * *